(12) United States Patent
Denoual et al.

(10) Patent No.: US 12,401,865 B2
(45) Date of Patent: Aug. 26, 2025

(54) METHOD AND APPARATUS FOR ENCAPSULATION OF MEDIA DATA IN A MEDIA FILE

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Val d'Anast (FR); Jean Le Feuvre, Gometz-le-Chatel (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/696,826

(22) PCT Filed: Sep. 20, 2022

(86) PCT No.: PCT/EP2022/076085
§ 371 (c)(1),
(2) Date: Mar. 28, 2024

(87) PCT Pub. No.: WO2023/052199
PCT Pub. Date: Apr. 6, 2023

(65) Prior Publication Data
US 2024/0406519 A1 Dec. 5, 2024

(30) Foreign Application Priority Data
Sep. 29, 2021 (GB) .................................. 2113970

(51) Int. Cl.
*H04N 21/84* (2011.01)
*H04N 21/845* (2011.01)

(52) U.S. Cl.
CPC ......... *H04N 21/84* (2013.01); *H04N 21/8456* (2013.01)

(58) Field of Classification Search
None
See application file for complete search history.

(56) References Cited

U.S. PATENT DOCUMENTS

2011/0231569 A1* 9/2011 Luby ................ H04N 21/44209
709/234
2017/0134829 A1* 5/2017 Maze ...................... H04L 65/70
(Continued)

FOREIGN PATENT DOCUMENTS

EP 2946566 A1 11/2015
WO 2011038028 A2 3/2011
(Continued)

*Primary Examiner* — Alexander Q Huerta
(74) *Attorney, Agent, or Firm* — Canon U.S.A., Inc. IP Division

(57) ABSTRACT

A method of encapsulating media data into a media file, the method comprising: obtaining a time boundary in a time interval corresponding to the presentation duration of an original sample of the media data; duplicating the original sample into two consecutive duplicated samples separated by the time boundary, the two duplicated samples having a same data part corresponding to the data part of the original sample; generating a time adjustment indication indicating for each duplicated sample the relationship between the time interval corresponding to the presentation duration of the duplicated sample and the time interval corresponding to the presentation duration of the original sample; and encapsulating the media data comprising the duplicated samples and the time adjustment indication in the media file, the time adjustment indication being located in metadata describing the media data.

16 Claims, 9 Drawing Sheets

(56) References Cited

U.S. PATENT DOCUMENTS

2017/0223083 A1* 8/2017 Maze ................. H04L 65/65
2020/0021883 A1* 1/2020 Stockhammer .... H04N 21/4402
2020/0381022 A1* 12/2020 Ilola .................... G11B 27/102
2022/0337846 A1* 10/2022 Ouedraogo ........ H04N 21/8451

FOREIGN PATENT DOCUMENTS

| WO | 2011038028 A9 | 5/2011 |
| WO | 2011038028 A3 | 10/2011 |

* cited by examiner

METHOD AND APPARATUS FOR ENCAPSULATION OF MEDIA DATA IN A MEDIA FILE

CROSS REFERENCE TO RELATED APPLICATION

This application is the National Phase application of PCT Application No. PCT/EP2022/076085, filed on Sep. 20, 2022. This application claims the benefit under 35 U.S.C. § 119(a)-(d) of United Kingdom Patent Application No. 2113970.4, filed on Sep. 29, 2021 and entitled "METHOD AND APPARATUS FOR ENCAPSULATION OF MEDIA DATA IN A MEDIA FILE". The above cited patent applications are incorporated herein by reference in its entirety.

FIELD OF THE INVENTION

The present disclosure concerns a method and a device for encapsulating media data in a media file. It concerns more precisely the encapsulation of samples when a time boundary crosses the presentation duration of the sample. Such time boundaries may occur in different situations like track fragmentation or time alignment on random access points, for example.

BACKGROUND OF INVENTION

Video coding is a way of transforming a series of video images into a compact digitized bit-stream so that the video images can be transmitted or stored. An encoding device is used to code the video images, with an associated decoding device being available to reconstruct the bit-stream for display and viewing. A general aim is to form the bit-stream so as to be of smaller size than the original video information. This advantageously reduces the capacity required of a transfer network, or storage device, to transmit or store the bit-stream code. To be transmitted, a video bit-stream is generally encapsulated according to a transmission protocol that typically adds headers and check bits. Video streaming mechanisms are widely deployed and used over the Internet network and mobile networks to stream audio/video media over HTTP (HyperText Transfer Protocol) such as 3GPP's Adaptive HTTP Streaming (AHS), Microsoft's Smooth Streaming or Apple's HTTP live streaming for instance.

Recently, the Moving Picture Experts Group (MPEG) published a new standard to unify and supersede existing streaming solutions over HTTP. This new standard, called "Dynamic adaptive streaming over HTTP (DASH)", is intended to support a media-streaming model over HTTP based on standard web servers, in which intelligence (i.e. selection of media data to stream and dynamic adaptation of the bit-streams to user choices, network conditions, and client capabilities) relies exclusively on client choices and devices.

In this model, a media presentation is organized in data segments and in a manifest called "Media Presentation Description (MPD)" which represents the organization of timed media data to be presented. In particular, a manifest comprises resource identifiers to use for downloading data segments and provides the context to select and combine those data segments to obtain a valid media presentation. Resource identifiers are typically HTTP-URLs (Uniform Resource Locator), possibly combined with byte ranges. Based on a manifest, a client device determines at any time which media segments are to be downloaded from a media data server according to its needs, its capabilities (e.g. supported codecs, display size, frame rate, level of quality, etc.), and depending on network conditions (e.g. available bandwidth).

It is to be noted that there exist alternative protocols to HTTP, for example the Real-time Transport Protocol (RTP).

ISOBMFF is standardized by the International Standardization Organization as ISO/IEC 14496-12. In the present document, the term "ISOBMFF" is used in a more general meaning as referring not only to the core ISOBMFF standard cited above but also to the different extensions of this standard aiming at specifying file formats based on ISOBMFF for different or more specific purpose. ISOBMFF is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters. According to this file format, the timed media data bit-stream is contained in a data structure referred to as mdat box that is defined in one or several data structures referred to as track boxes. The track represents a timed sequence of samples where a sample corresponds to all the data associated with a single timestamp that is to say all the data associated with a single frame or all the data associated with several frames sharing the same timestamp. Media data in mdat boxes are described in other hierarchical structured boxes constituting metadata, also called structure data.

Several strategies can be adopted when using ISO BMFF embedding these mechanisms to describe sub-information and to ease access to this sub-information or to efficiently organize bit-streams into multiple segments. For example, a media presentation may be encapsulated as:

a) a single file containing a particular file header comprising a file type box "ftyp" and a movie box "moov" containing all ISO BMFF metadata (including track definitions), the single file also comprising a single mdat box containing the whole encoded bit-stream. This organization is suitable for local storage but is not the best adapted to HTTP streaming, especially live streaming;

b) a single file containing multiple moof/mdat boxes suitable for fragmentation each couple of moof/mdat being relative to one of the multiple segments of the bit-streams. This format allows for progressive download. More in detail, the moof box is equivalent to the moov box at movie fragment (also called fragment in the description) level.

c) multiple segments files, each file being accessible by its own URL and being downloadable independently. Each file is related to one fragment and the multiple segment files are preferably preceded by a dedicated initialization file. Each segment typically consists of a segment type box (styp), which acts as a kind of file header, an optional segment index box (sidx) and one or multiple fragments. Again, each fragment consists of a moof and an mdat box. According to this scheme, using a fragmented media file, each track may be stored in its own segment with the associated bit-stream. . . . Such an encapsulation is particularly suitable for streaming tracks independently. It is well adapted to the DASH standard.

When the media file comes as multiple segment files, each file corresponds to a segment containing a temporal portion of the presentation. A segment comprises one or several fragments. Each fragment has its own metadata part, typically a 'moof' box and a media data part, typically a 'mdat' box. Each file is divided into tracks; each track represents a timed sequence of media (frames of video, for example). Within each track, each timed unit is called a sample. Each track has one or more sample descriptions; each sample in the track is tied to a description by reference in the metadata part of the file. All the structure-data or metadata, including that defining the placement and timing of the media, is contained in structured boxes. The media data (frames of video, for example) is referred to by this structure-data or metadata. The overall duration of each track is defined in the metadata. Each sample has a defined duration. The exact decoding timestamp of a sample is defined by summing the durations of the preceding samples.

A fragmented ISO Base Media File is a media file in which the MovieBox ('moov') does not contain the information for the full duration of the movie. In particular, it may have few or no samples in its tracks. To this minimal or empty movie, extra samples are added, in structure called movie fragments, described by a hierarchy of boxes. Presence or absence of movie fragments in a media file is indicated by the MovieExtendsBox ('mvex'). The use of movie fragments is relevant for live encoding and live packaging, because it requires less buffer capacities for encapsulation modules. This is also relevant for low-latency streaming, for example for adaptive streaming over HTTP like DASH or HLS (HTTP Live Streaming), because encoded media can be available as soon as a movie fragment is encoded and encapsulated. Movie fragments have a box hierarchy that differs from the box hierarchy under a Track-Box describing a non-fragmented track. Especially, the sample description may come with a TrackRunBox 'trun' combined with default parameters possibly declared in a TrackFragmentHeaderBox ('traf'). For example, for the timing, a track fragment may contain a TrackFragmentBaseMediaDecode TimeBox 'tfdt' providing the absolute decoding timestamp (using a baseMediaDecodeTime parameter), measured on the decoding timeline, of the first sample in decoding order in the track fragment. Then, each sample in the fragment has a duration indicated either in a default value in TrackFragmentHeaderBox ('traf'), or in the TrackRunBox 'trun'. The indication in 'tfdt' can be useful, for example, when performing random access in a file: it is not necessary for player or reader to sum the sample durations of all preceding samples in previous fragments to find this value. For example, the MPEG DASH specification or the CMAF specification mandates this box to be present in each 'traf' box of a media segment in live profile for ISOBMFF.

In a media file, a track comprises a sequence of timed samples. Each sample is associated with a presentation (or composition) time and a duration. The presentation time determines the moment for the display of the sample when rendering the track. The duration determines the time duration of the presentation of the sample when rendering the track. For a video track each sample corresponds typically to an image of the video sequence. For an audio track each sample corresponds typically to a frame of the audio sequence. In that case, the presentation time is typically periodic while the duration is the same for all samples. We then call this kind of track a periodic track or periodic media track.

When rendering a media file or a fragmented media file, each track defines a timeline. The presentation timelines of all the tracks are aligned at their zero point. The beginning of this timeline corresponds to the presentation time of the first sample of each track. Fragmented files provide random accessible samples to start presentation from an offset time (also called tune-in) or to seek in the media presentation, then no more presenting from a zero point but from a given time. There is an interest to have movie fragments with their first sample aligned in time to allow synchronized presentation of tracks.

A periodic track or periodic media track may be associated with a sparse track. A sparse track comprises samples, each sample being associated with its own presentation time and duration. Compared to periodic tracks, a sparse track may not have predetermined rule between presentation time of different samples and each sample may have its own duration which differ from one sample to another. Compared to periodic tracks, the number of samples in a sparse track is typically lower than the number of samples of a periodic track, which explains the name "sparse track". Samples of a sparse track will be called sparse samples in the following. A sparse sample to encapsulate may also be called an original sample. As an example, a sparse track may comprise subtitles for the video. Each subtitle has a presentation time corresponding to the moment a character speaks. The duration is associated with the time of the speech of the character. There may be times where no character speaks corresponding to time where there are no samples to be rendered in the sparse track.

When encapsulating media data into fragmented media files, there is a need to split the media data into tracks in the media file according to the predetermined duration of the movie fragments (or fragments) or of the segments. The duration of the fragment defines a time boundary used for splitting the tracks into fragments. This duration may be constrained by application, for example streaming with low-latency, or encoder buffer sizes or live production of the content. For periodic data, the duration of the fragments is typically a multiple of the duration of a periodic sample in order to have the fragment (or segment) boundaries corresponding to sample boundaries. But fragment (or segment) boundaries are most likely not corresponding to sparse sample boundaries, which are not predictable. Periodic samples and sparse samples may be generated by different content creators or different applications. For example, a fragment (or segment) of a periodic track may begin in the middle of the duration of a sparse sample. Applying the fragmentation of a periodic track to a sparse track may then result in one or more movie fragments in the sparse track without a first sample starting at the beginning of the movie fragment. This may be a problem for starting at a given time (also called "tune-in"), or seeking in the media presentation.

A sample may have a presentation duration greater than the duration of the fragment. In that case, several time boundaries may occur during the presentation duration of the sample.

The same problem may also occur if different periodic tracks are fragmented. If two tracks comprise periodic samples with a different period time, then the time boundary corresponding to the fragmentation time may not fall at a sample boundary in the two different tracks.

The problem also occurs when a periodic sample is defined as a random access point, stream access point, or random access recovery point. A random access point, stream access point, or random access recovery point defines a time in the media data associated with a possible start of decoding. In this case, the parser must be able to begin the rendering with this periodic sample defined as a random access point, stream access point, or random access recovery point. A random access point, stream access point, or random access recovery point defines a time boundary that has to be treated as a fragment (or segment) boundary for time alignment of sparse samples.

In all these situations, where a time boundary falls into the presentation duration of an original sample (sample to encapsulate), there is an encapsulation issue, as a sample with a presentation time corresponding to the time boundary would be required.

Some samples have a dynamic content (or internal timing), which means that the rendering of the sample evolves during the presentation duration of the sample, as indicated by the internal timing. An example of sample with a dynamic content, or dynamic sample for short, is an animated karaoke sentence of a song lyric. The presentation duration of the sentence may last, for example, three seconds. During these three seconds, a progression bar (the animation) evolves in the sentence to visualize the pronunciation of the sentence. Another example may be an animated logo moving on top of a video. In that case, the rendering of the dynamic sample must not be impaired by the time boundary.

SUMMARY OF THE INVENTION

The present invention has been devised to address one or more of the foregoing concerns. It concerns the encapsulation of media data comprising sparse samples into fragmented media files.

According to a first aspect of the invention there is provided a method of encapsulating media data into a media file, the method comprising:
  obtaining a time boundary in a time interval corresponding to the presentation duration of an original sample of the media data;
  duplicating the original sample into two consecutive duplicated samples separated by the time boundary, the two duplicated samples having a same data part corresponding to the data part of the original sample;
  generating a time adjustment indication indicating for each duplicated sample the relationship between the time interval corresponding to the presentation duration of the duplicated sample and the time interval corresponding to the presentation duration of the original sample; and
  encapsulating the media data comprising the duplicated samples and the time adjustment indication in the media file, the time adjustment indication being located in metadata describing the media data.

In an embodiment, the time adjustment indication comprises at least one of:
  an elapsed time corresponding to a time difference between a presentation time of the original sample and a presentation time of the duplicated sample; and
  an original duration corresponding to the duration of the original sample.

In an embodiment, the media data are encapsulated into a track, and wherein the time boundary corresponds to a random access point of the track.

In an embodiment, the media data are encapsulated into a fragmented track, and wherein the time boundary corresponds to a fragment boundary of the track.

In an embodiment, the track comprising a data part comprising the media samples and a metadata part consisting in a hierarchy of boxes describing the track, the time adjustment indication is encapsulated in a track fragment box describing the fragment of the track.

In an embodiment, the time adjustment indication comprises:
  a first indication for indicating that the last sample of the track fragment has a shorter duration than the corresponding original sample; and
  a second indication for indicating that the first sample of the track fragment has been duplicated.

In an embodiment, the original sample comprises media data which rendering evolves during the presentation duration of the sample.

According to another aspect of the invention there is provided a method for rendering media data from a media file, the method comprising:
  obtaining samples of media data and metadata describing the media samples from the media file;
  obtaining in the metadata a time adjustment indication relative to a duplicated sample among the obtained samples, the duplicated sample being duplicated from an original sample, the time adjustment indication indicating for the duplicated sample the relationship between the time interval corresponding to the presentation duration of the duplicated sample and the time interval corresponding to the presentation duration of the original sample; and
  rendering the media data of the duplicated sample based on the time adjustment indication.

In an embodiment, the time adjustment indication comprises at least one of:
  an elapsed time corresponding to a time difference between a presentation time of the original sample and a presentation time of the duplicated sample; and
  an original duration corresponding to the duration of the original sample.

In an embodiment, the media data are encapsulated into a track, and wherein the duplicated sample corresponds to a random access point of the track.

In an embodiment, the media data are encapsulated into a fragmented track, and wherein the duplicated sample corresponds to a fragment boundary of the track.

In an embodiment, the track comprising a data part comprising the media samples and a metadata part consisting in a hierarchy of boxes describing the track, the time adjustment indication is obtained from a track fragment box describing the fragment of the track.

In an embodiment, the time adjustment indication comprises:
  a first indication for indicating that the last sample of the track fragment has a shorter duration than the corresponding original sample; and
  a second indication for indicating that the first sample of the track fragment has been duplicated.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

According to another aspect of the invention there is provided a computer program which upon execution causes the method of the invention to be performed.

According to another aspect of the invention there is provided a device for encapsulating media data into a media file, the device comprising a processor configured for:

obtaining a time boundary in a time interval corresponding to the presentation duration of an original sample of the media data;

duplicating the original sample into two consecutive duplicated samples separated by the time boundary, the two duplicated samples having a same data part corresponding to the data part of the original sample;

generating a time adjustment indication indicating for each duplicated sample the relationship between the time interval corresponding to the presentation duration of the duplicated sample and the time interval corresponding to the presentation duration of the original sample; and encapsulating the media data comprising the duplicated samples and the time adjustment indication in the media file, the time adjustment indication being located in metadata describing the media data.

According to another aspect of the invention there is provided a device for rendering media data from a media file, the device comprising a processor configured for:

obtaining samples of media data and metadata describing the media samples from the media file;

obtaining in the metadata a time adjustment indication relative to a duplicated sample among the obtained samples, the duplicated sample being duplicated from an original sample, the time adjustment indication indicating for the duplicated sample the relationship between the time interval corresponding to the presentation duration of the duplicated sample and the time interval corresponding to the presentation duration of the original sample; and rendering the media data of the duplicated sample based on the time adjustment indication.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF THE INVENTION

Figure 1:
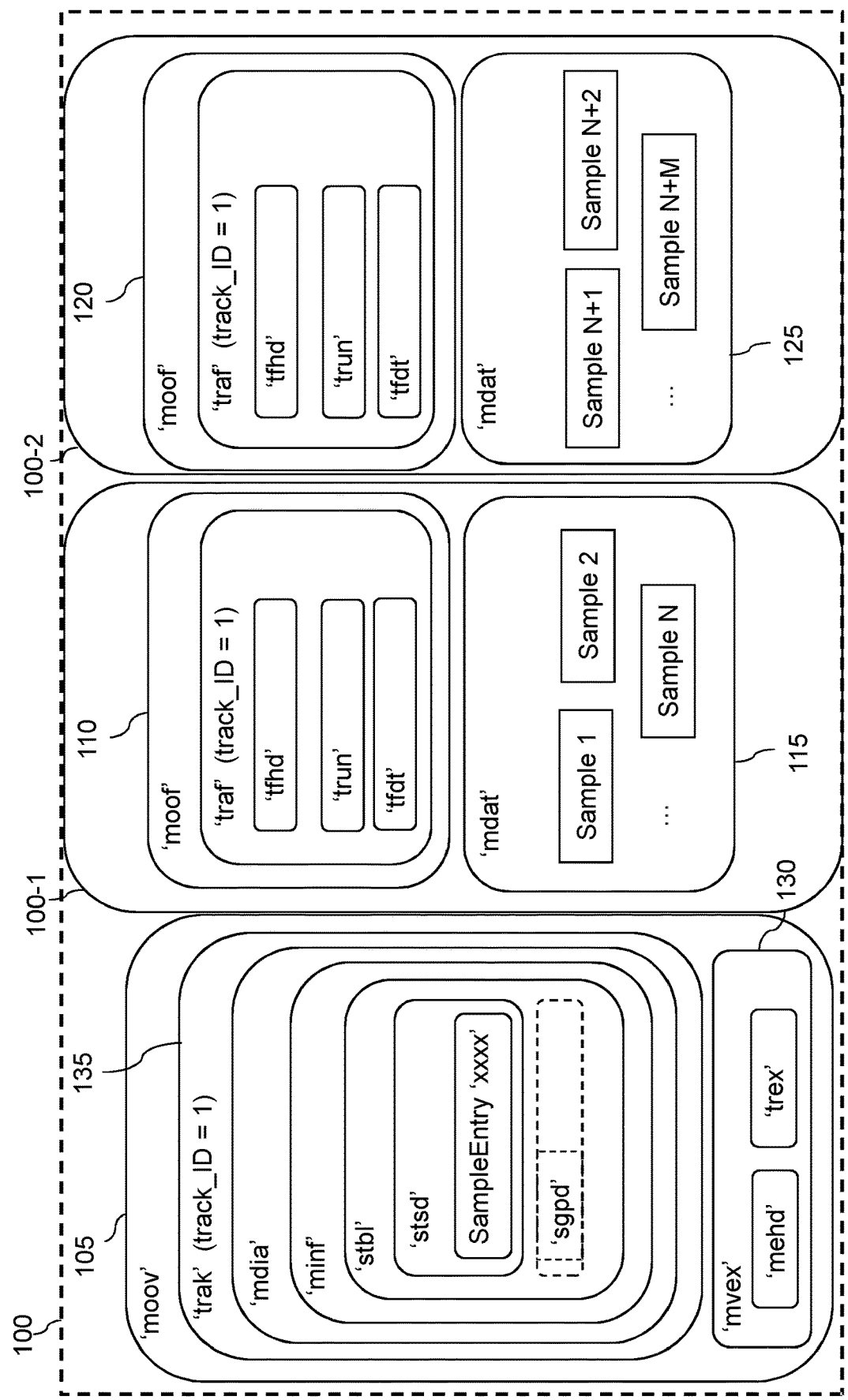
FIG. 1 illustrates an example of encapsulated media data temporally organized as a fragmented presentation in one or more media files.

FIG. 1 illustrates an example of encapsulated media data temporally organized as a fragmented presentation in one or more media files according to the ISO Base Media File Format.

The media data encapsulated in the one or more media files 100 starts with a FileTypeBox ('ftyp') box (not illustrated) providing a set of brands identifying the precise specifications to which the encapsulated media data conforms, that are used by a reader to determine whether it can process the encapsulated media data. The 'ftyp' box is followed by a MovieBox ('moov') box referenced 105. The MovieBox box provides initialization information that is needed for a reader to initiate processing of the encapsulated media data. In particular, it provides a description of the presentation content, the number of tracks, and information regarding their respective timelines and characteristics. For the sake of illustration, the MovieBox box may indicate that the presentation comprises one track having an identifier track_ID equal to 1.

As illustrated, MovieBox box 105 is followed by one or more movie fragments 100-1 or 100-2 (also called media fragments), each movie fragment comprising metadata stored in a MovieFragmentBox ('moof') box (and its sub boxes) and media data stored in a MediaDataBox ('mdat') box (or identified media data box 'imda'). For the sake of illustration, the one or more media files 100 comprises a first movie fragment 100-1 containing and describing samples 1 to N of a track identified with track_ID equal to 1. This first movie fragment is composed of 'moof' box 110 and of 'mdat' box 115. Still for the sake of illustration, the one or more media files 100 comprises a second movie fragment 100-2 containing and describing samples N+1 to N+M of the track identified with track_ID equal to 1. This second movie fragment is composed of 'moof' box 120 and of 'mdat' box 125.

When the encapsulated media data is fragmented into a plurality of files (e.g. segment files), the FileTypeBox and MovieBox boxes (also denoted initialization fragment in the following) are contained within an initial media file (also denoted an initialization segment), in which the track(s) contain no samples. Subsequent media files (also denoted segment files or media segments in MPEG DASH) contain one or more movie fragments. These one or more movie fragments may constitute an ISOBMFF segment, a DASH segment or DASH media segment or a CMAF Fragment.

Among other information, 'moov' box 105 may contain a MovieExtendsBox ('mvex') box 130. When present, information contained in this box warns readers that there might be subsequent movie fragments and that these movie fragments must be found and scanned in the given order to obtain all the samples of a track. To that end, information contained in this box should be combined with other information of the MovieBox box. MovieExtends Box 130 contain box may an optional MovieExtendsHeaderBox ('mehd') box and one TrackExtendsBox ('trex') box per track defined in MovieBox box 105. When present, the MovieExtendsHeaderBox box provides the overall duration of a fragmented movie. Each TrackExtendsBox box defines default parameter values for the description of the samples (type, size, duration, control flags . . . ) of the track fragment.

As illustrated, 'moov' box 105 also contains one or more TrackBox ('trak') boxes 135 describing each track in the presentation. TrackBox box 135 contains in its box hierarchy a SampleTableBox ('stbl') box that in turn contains descriptive and timing information of the media samples of the track. It is noted that when the media file 100 is fragmented, it may have no sample described in the boxes under the SampleTableBox 'stbl', like the boxes providing sample size or timing information. However, the SampleTableBox 'stbl' contains a SampleDescriptionBox ('stsd') box containing one or more SampleEntry boxes giving descriptive information about the coding format of the samples (the coding format being identified with a 4CC, as illustrated with 'xxxx' characters), and initialization information needed for configuring a decoder according to the coding format (not represented).

According to ISO Base Media File Format, all tracks and all sample entries in a presentation are defined in 'moov' box 105 and cannot be declared later on during the presentation.

It is observed that a movie fragment may contain samples for one or more of the tracks declared in the 'moov' box, but not necessarily for all of the tracks. The MovieFragmentBox box 110 or 120 contains a TrackFragmentBox ('traf') providing an identifier (e.g. Track_ID=1) identifying each track for which samples are contained in the 'mdat' box 115 or 125 of the movie fragment. Among other information, the 'traf' box contains a TrackFragmentHeaderBox ('tfhd') box and may contain one or more TrackRunBox ('trun') boxes documenting a contiguous set (a run) of samples for a track in the movie fragment. A 'traf' box may also contain a box for decoding time information the Track fragment decode time box 'tfdt'.

An extension of ISOBMFF (ISO/IEC 23001-18) defines tracks with samples that store timed events. A timed event is defined as aperiodic sparse information that is intended for a specific interval of media-time. This aperiodic sparse information is stored in a sparse sample, described in corresponding metadata.

Aperiodic and sparse mean that, in opposition to audio or video samples for example, the timed events may not follow a timescale (i.e. one sample at each timescale or each multiple of a timescale). Their duration may be highly variable, still in opposition to video or audio frames for example where we have a frame rate.

Sparse means that there may be less samples in a track than usually found in a video or audio track (see example of FIG. 2). As a shortcut, we may call a sample storing one or more timed event a sparse sample, an "event" or a "timed event".

These events can be used to carry information intended to be synchronized with a periodic media data stream, typically a video or audio track, used to support use cases such as dynamic content replacement, ad insertion, presentation of supplemental content alongside the audio or video, or more generally, making changes to a web page, or executing application code triggered at specific points on the media timeline of an audio or video media stream. The periodic media track may have one or more associated sparse tracks. The association may be indicated within a Track reference box ('tref').

An event has a start time and a duration in its payload respectively corresponding to the start of and to the interval of media-time when the information of the event is applicable. The ISO/IEC 23001-18 was first designed to convey DASH-specific event messages but the concepts may apply to any event. A sparse sample in the data part of this track may comprise one or several event message instance box defined as follows:

```
aligned(8) class EventMessageInstanceBox
    extends FullBox('emib', version, flags = 0) {
    unsigned int(32)      reserved = 0;
    signed int(64)        presentation_time_delta;
    unsigned int(32)      event_duration;
    unsigned int(32)      id;
    string                scheme_id_uri;
    string                value;
    unsigned int(8)       message_data[ ];
}
``` where:
presentation_time_delta provides the start time of the event on the media presentation timeline relative to the presentation time of the sample enclosing the EventMessage InstanceBox.
The presentation_time_delta and event_duration values are in the number of ticks in the timescale defined in the track's MediaHeaderBox.
The type of event is indicated by the scheme_id_uri and the message_data represents the payload of the event.
Then, if the media presentation time of the containing sample is T, the active interval is defined to run from (T+presentation_time_delta) to, but not including, (T+presentation_time_delta+event_duration). The presentation_time_delta allows shifting in time the start of the presentation of the event. It is to be noted that however, this does not allow indicating where to start in this event (the whole sample would be rendered when using presentation_time_delta and for its event_duration).

In summary, a sparse sample is defined with a presentation time and a duration indicated in the metadata describing the sample. It may comprise in the data part, one or several events, each event being associated with a presentation_time_delta information indicating an offset relative to the presentation time of the sparse sample, and its own duration. All the events present in a given sparse sample must have their presentation comprised in the time window defined by the presentation time and the duration of the sparse sample.

Figure 2A:
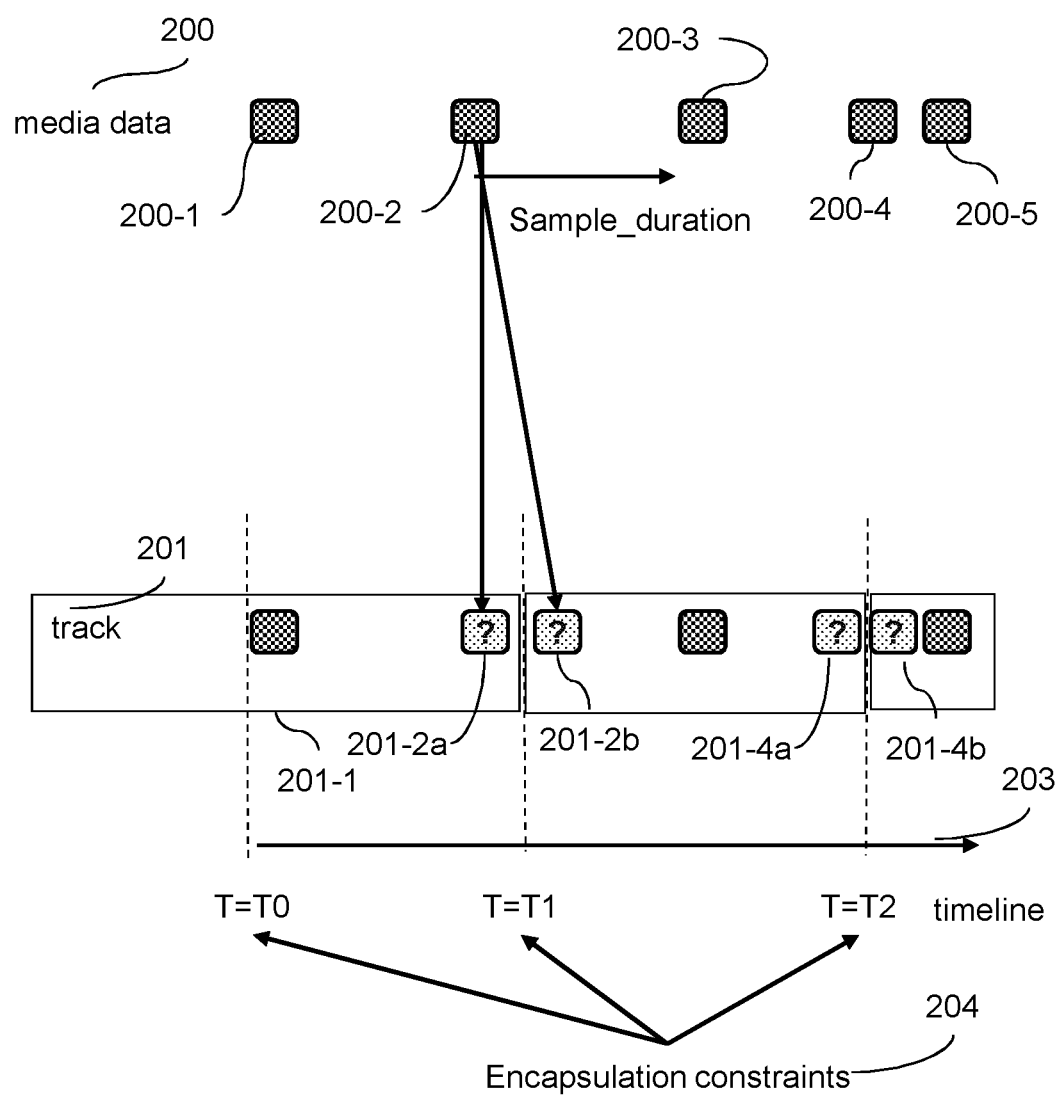
FIGS. 2a and 2b illustrate the problem to be solved based on examples.
Figure 2B:
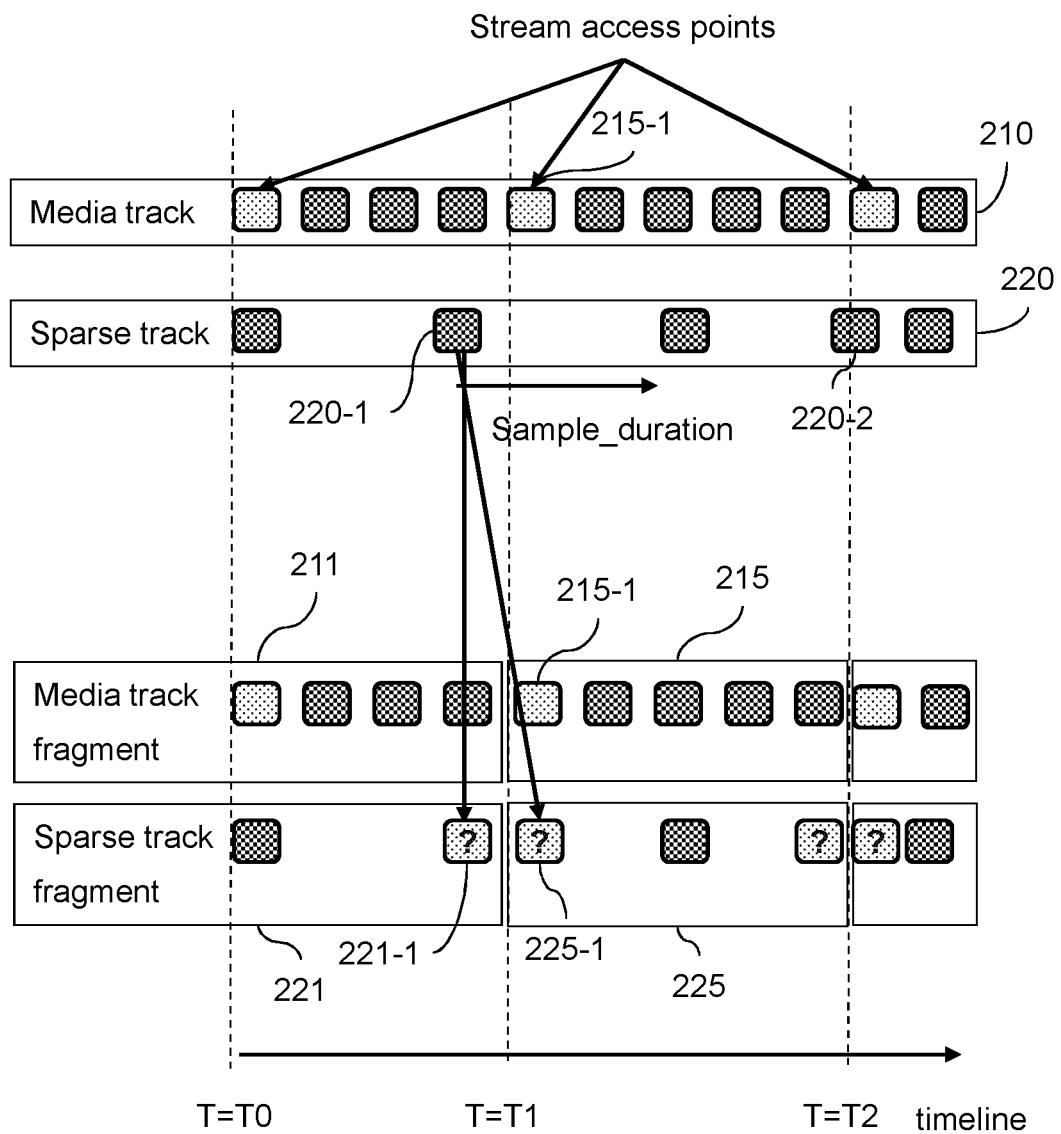

FIG. 2*a* illustrates the problem of encapsulating media data into a track for storage or transmission to media player, possibly with other media tracks (as illustrated by FIG. 2*b*). In this example, the media data 200 is made up of samples 200-1 to 200-5. Each sample has its own decoding time or presentation time and presentation duration. The duration may differ from one sample to another potentially leading to non-periodic samples. A non-periodic sample may be called a sparse sample. Some samples in the media data may also use timing relative to their decoding time or presentation time together with some internal timing (either explicit or implicit) information, for example to represent animations during the lifetime of a sample. Such sample may be called a dynamic sample as its content evolves during the presentation of the sample. An example of sparse samples with internal timing are 3GPP timed text with karaoke effects enabled. In such example, the karaoke sample is displayed at its presentation time (that may be equal to its decoding or presentation time) until its presentation duration expires (i.e. next sample start), and an animation or progression is displayed over the text to provide a karaoke effect, at times indicated in the sample payload (the internal timing) but relative to the sample start (the presentation time). These samples are to be encapsulated into a track (also denoted media track) 201, for example compliant with the ISO Base Media File Format. The encapsulation configuration may impose some constraints 204 like for example presence of random access points in the media track or fragment duration when the media track 201 is stored in a fragmented ISOBMFF or in a CMAF file or in DASH media segment, for example for adaptive streaming over HTTP. Constraints on the presence of stream access points may be to allow tuning-in or seeking into the media presentation at specific times. These constraints 204 constitute time boundaries. They are illustrated on FIG. 2a by the vertical lines on a media timeline 203. These constraints, for example, impose the presence of a sample at time T0, T1 and T2. This sample may be considered as a stream access point in the encapsulated media track 201, but it may also not be a stream access point. This sample may be considered as the first sample of a movie fragment of track 201 when this track if fragmented. Since in the samples composing the media data 200, there may not be a sample starting at these constrained times T0, T1 or T2, there is a need to create and add one sample at these specific times from the existing ones, for example considering the previous one as illustrated with sample 200-2 for the time T1 (e.g. by duplicating a previous sample). There may be samples starting at a constrained time, for example the sample 200-1 with T=T0. In this case, the sample is encapsulated classically and no specific creation, modification or split of the sample is required. The problem here is that inserting a sample at these constrained times in track 201 while maintaining the same authoring intend, may require to edit the payload of the samples, and sometimes this sample payload cannot be edited. For example: a karaoke sample if split in two (as illustrated with sample 200-2 split or duplicated in two samples 201-2a and 201-2b with same payload in the track 201) would contain the same entire text to display, but it is not desirable to start again the animation or progression from the beginning. The second "split" sample would require additional information indicating e.g. how many ticks elapsed since the original sample start time (or presentation time). There is a need to provide such additional signaling when a sample has an internal timing. This differs from classical sample timing indication in tracks because we have here to specify a relative time to the decoding or presentation time of the sample or possibly an end time, or possibly both when a sample has a duration greater than a time interval imposed by encapsulation constraints 204. Moreover, this should be done in a way that also allows continuous or linear playout or rendering of the track 201, meaning that, for example the split samples 201-2a and 202-b should be played as if only the original sample 200-2 was present in the track. The same problem may occur for original sample 200-4 and split samples 201-4a and 201-4b. It is to be noted that in the description of the solution, instead of split samples, we may talk about duplicated samples for 201-2a, 201-2b, 201-4a or 201-4b.

FIG. 2b illustrates the problem to be solved for streaming a media presentation. In this example, already encapsulated non-fragmented tracks 210, 220, are encapsulated into fragmented tracks 211, 221. Similarly, it may be possible to directly encapsulate a bitstream into fragmented tracks facing the same issues.

Media track 210 is a periodic media track, typically video or audio media data. It may be associated (e.g. using TrackReferenceBox 'tref') with one or more additional sparse tracks 220 providing additional contents to display or render with the media track 210. The media track may be for example a video track and there may be at least one additional track, for example a timed text, (e.g. 3GPP Timed text), or WebVTT, track with animation script providing animated text on top of the video. The additional track may contain samples as in 200 on FIG. 2a.

It could be also animated text for artist or title or lyrics overlaid displayed in an audio player with the audio track. Additional sparse tracks may, for example be a subtitle CMAF track with animation effects to render the subtitle. Each sample in the periodic media track and in the sparse track has an expected decoding or presentation time and a presentation duration. To prepare these contents for adaptive streaming, for example with MPEG DASH (Dynamic Adaptive Streaming over HTTP) or with HLS (HTTP Live Streaming), the periodic media track and associated sparse tracks may be segmented or fragmented (one segment containing one or more fragments). For joint streaming of periodic media track and its associated sparse tracks, the fragments for these tracks 211, 215 and 221, 225 may have, at least some of, their random access points (e.g. the ones depicted as stream access points in track 210) aligned in time (for example the first samples or the samples 215-1 and 225-1 at time t=T1). The time T1 corresponds to a time boundary that can be a movie fragment (or fragment) or a segment boundary. This may raise issues for some samples in some sparse tracks like sample 220-1 depicted in FIG. 2b (the same problem may occur in next fragments or even for a sample with a presentation duration that crosses a time boundary like original sample 220-2). Since the periodic media tracks 210 and the sparse tracks 220 may not be generated by the same content creator or not at the same time, and due to the unpredictability of the presentation time of sparse samples, their samples may not be time aligned at construction time. For joint streaming, there is a need for random access samples in the sparse track fragments (like 225-1) to allow players to start from any point (tune-in) in the timeline or to seek to a specific time in the timeline (e.g. to T1 or T2), for example at the beginning of a movie fragment or of a segment. The problem is to find a way to encapsulate the sparse samples, considering the original sparse samples available in sparse tracks 220 while preserving the random access capabilities offered by the periodic media track 210. It is to be noted that there may be as many fragmented sparse tracks than there are non-fragmented sparse tracks associated with the periodic media track. The timeline is defined by the one of the periodic media track.

The fragmentation process described in this document proposes in one embodiment to split samples (e.g. 220-1) in two or more and to duplicate parts, i.e. into samples (e.g. 221-1 and 225-1) having the same content but presented at different times. In order to keep a correct rendering, the player needs to understand how long a sample was supposed to have been playing. Unfortunately, this information is not available in the file format, only the intended decode time (with a sample duration) is given.

Considering state of the art, the only possibility to solve this problem is currently to edit the sample payload. This has several drawbacks:

the DASH/HLS segmenter is no longer media agnostic, it needs to be able to parse and edit the animation contained in the samples, requiring support for numerous different formats like TTML, WebVTT . . . any format representing timed events sample edition can be quite complex if not impossible in some cases (e.g. HTML plus JavaScript)

defragmentation (storing movie fragments into a non-fragmented ISOBMFF) will introduce new samples, or will need to be media agnostic to merge these samples.

The proposed solution is based on splitting an original sample into two duplicated new samples. The data part of the sample is just copied in a media data box without any amendment. The presentation time and duration of each duplicated sample has to be adjusted in order to fit the presentation time and duration of the original sample. Typically, the presentation time of the first duplicated sample corresponds to the presentation time of the original sample while its duration is shortened to end at a time corresponding to the time boundary. The presentation time (or decoding time) of the second duplicated sample corresponds to the time boundary, while its duration is shortened to end at the time of ending of the original sample. The process can be iterated for splitting an original sample into more than two duplicated samples when more than one time boundary crosses the time interval corresponding to the presentation duration of the original sample. When the original sample is a dynamic sample (i.e. with internal timing), the parser when rendering a duplicated sample needs to know precisely the timing relationship between the presentation time interval of the duplicated sample and the presentation time interval of the original sample. When rendering the dynamic sample, the animated content must be played according to the presentation time and duration of the original sample. Accordingly, an indication for time adjustment of the duplicated samples may be included in the metadata describing the track. This time adjustment indication may concern the presentation time and duration of the duplicated sample. It may further comprises an indication of the relationship of the presentation time and duration of the duplicated sample with the presentation time and duration of the original sample. This indication may be located in different parts of the metadata according to embodiments. This time adjustment indication may be split in different parts, for example a first part relative to the first duplicated sample and a second part relative to the second duplicated sample.

Figure 3:
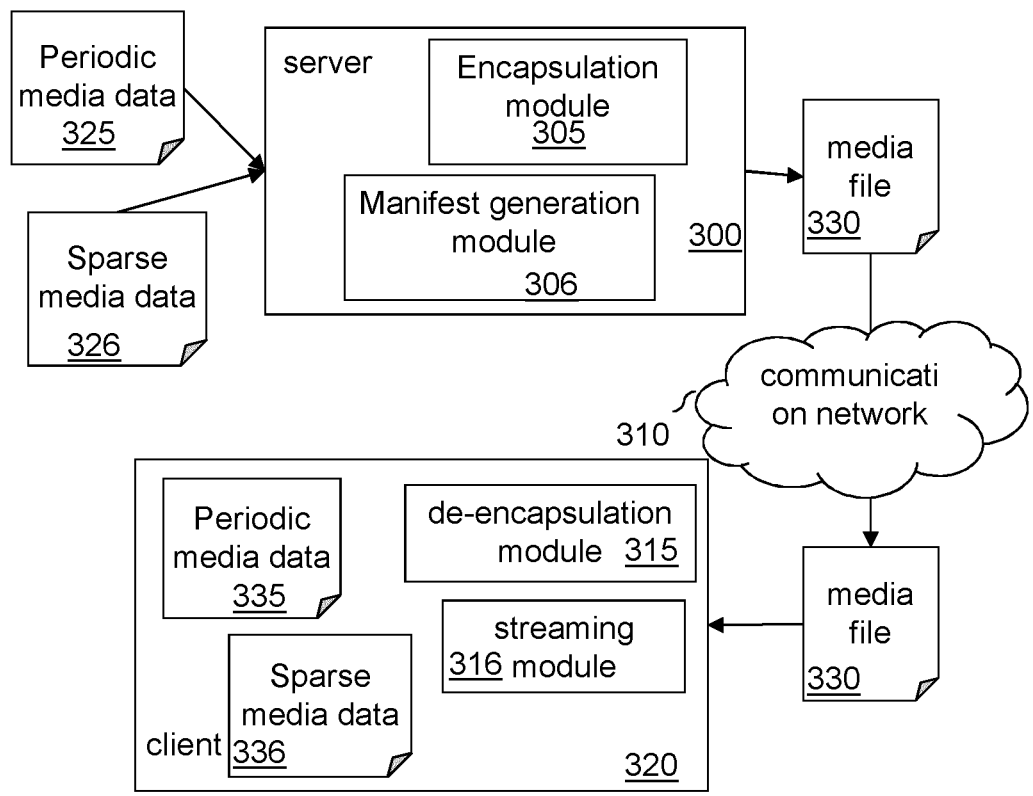
FIG. 3 illustrates a high-level view of an example of the proposed method for the encapsulation or storage of sparse media data associated with periodic media data in media files.

FIG. 3 illustrates a high-level view of an example of the proposed method for the encapsulation or storage of sparse media data 326 (text, subtitles, animations . . . ) associated with periodic media data 325 (e.g. individual images or a sequence of images for a video or audio frames) in media files. As illustrated, a server 300 comprises an encapsulation module 305 (also called ISOBMFF writer or simply writer) and optionally a manifest generation module 306. The server 300 may be connected, via a network interface (not represented), to a communication network 310 to which is also connected, via a network interface (not represented), a client 320.

Server 300 processes sparse media data 326 and periodic media data 325 for streaming or for storage. The sparse media data 326 may consist in data to be rendered with the periodic media data, for example to enhance the presentation. It may be highlighted lyrics for karaoke applications, subtitles with effects, timed text information animated, a JavaScript monitoring VTT cue and triggering highlight text on top of video or even audio rendering, the highlighting being described by internal timing within the sample payload. For the karaoke example, it may be time ranges within the sample payload indicating which part of the lyrics are highlighted for a given video frame of the associated video track. From one frame to another, the highlighted part may change but these changes may be described in a single sample payload. The periodic media data 325 may correspond to audio presentation or video presentation or both. The timeline of the presentation is given by this periodic media data. The sparse data 326 are to be displayed with respect to this timeline, also called the media timeline or presentation timeline. The server 300 through the encapsulation module 305, encapsulates the sparse and periodic media data into tracks and samples according to ISOBMFF and its extensions (e.g. possibly CMAF, NAL-unit based File Format . . . ). The server 300 then generates a media file 330 or one or more segment files 330. The server 300 may optionally generate a streaming manifest like a DASH MPD or HLS playlist (not represented) when the presentation is streamed to the client 320.

According to the invention, the encapsulation module 305 generates an encapsulation file (or segment files) allowing synchronized access to periodic media data and their associated sparse media data.

Client 320 is used for processing data received from communication network 310, or read from a storage device, for example for processing media file or media segment files 330. The data may be streamed to the client, thus involving the streaming module 316 in charge of parsing a streaming manifest or playlist and of determining requests to fetch the media files (representing the media and sparse data) and of adapting the transmission, according to indication in the manifest or playlists. The received data is de-encapsulated in de-encapsulation module 315 (also known as a ISOBMFF parser or ISOBMFF reader or simply parser, reader or player), the de-encapsulated data (or parsed data) may be stored, displayed or output. The de-encapsulated data correspond to periodic media data 335 (e.g. video, images or audio) with associated sparse media data (subtitles, animations . . . ) 336.

Client or server may be user devices but may also be network nodes acting on the media files being transmitted or stored. Server or client may only contain, respectively, the encapsulation and de-encapsulation parts. Server may be embedded in a PC, camera, tablet or smartphone device. Client may be embedded in a TV, PC tablet or smartphone.

It is noted that media file 330 may be communicated to de-encapsulation module 315 in different ways. In particular, encapsulation module 305 may generate media file 330 with a media description (e.g. DASH MPD) and communicate (or stream) it directly to de-encapsulation module 315 upon receiving a request from client 320. The media file 330 may also be downloaded, at once or progressively, by and stored on the client 320. For the sake of illustration, media file 330 may encapsulate periodic media data and sparse media data into boxes according to ISO Base Media File Format (ISOBMFF, ISO/IEC 14496-12) and its derived specifications. In such a case, media file 330 may correspond to one or more media files (indicated by a FileTypeBox 'ftyp' or SegmentTypeBox 'styp'). According to ISOBMFF, media file 330 may include two kinds of boxes, one or more "media data box" (e.g. 'mdat' or 'imda'), containing the media data and "metadata boxes" (e.g. 'moov' or 'moof') containing metadata defining placement and timing of the media data. The media data box(es) contain all the data for periodic media data 325 and sparse media data 326. There may be one media data box multiplexing periodic media data 325 and sparse media data 326 but there may also be one or more media data boxes, a first set for the sparse data, a second one for the media data or one per media type or stream.

Figure 4:
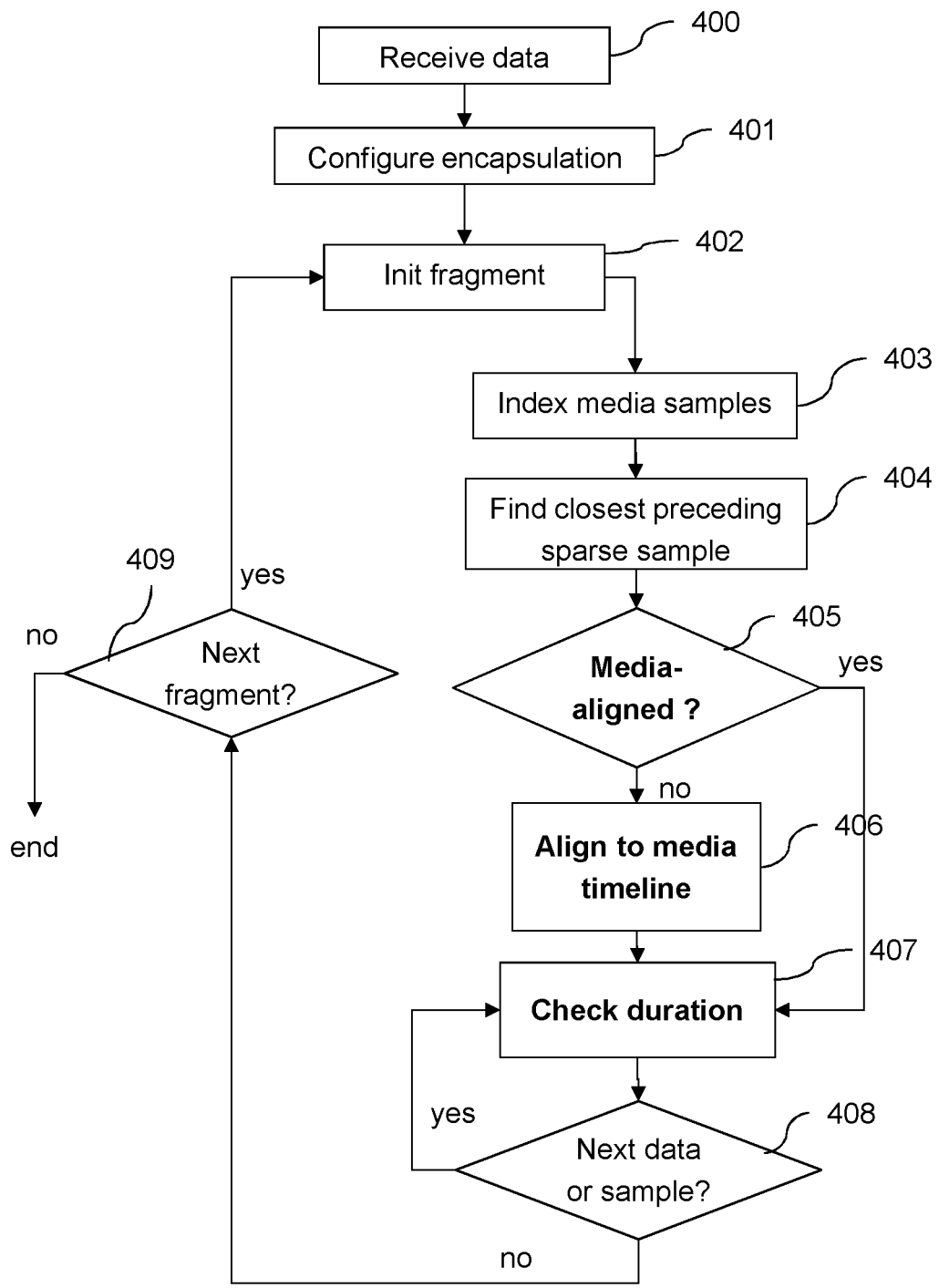
FIG. 4 illustrates the encapsulation process according to an embodiment of the invention.

FIG. 4 illustrates the encapsulation process according to an embodiment of the invention. This is done by the encapsulation module 305. The process starts in step 400 by receiving media data (e.g. sparse media data 326) to encapsulate. Periodic media data or sparse media data may be pre-encoded (for example available on a local or remote storage medium) or be received from live encoders (for example temporarily buffered in a memory of the encapsulation module). The received media data may also be already encapsulated, for example in non-fragmented manner or in a different container than ISOBMFF, but in a way that does not align the tracks for random access or adaptive streaming with low latency.

A configuration or initialization step 401 consists in setting parameters for the encapsulation module 305 and optionally for the manifest generation module 306. For example, the duration of the movie fragments is specified, the position of the random-access points in the presentation may also be specified. The step 401 also consists in setting up encapsulation parameters like for example: segmentation, fragmentation aspects or/and whether data will be multiplexed or not, single track or multi-track encapsulation, all the tracks in a same media file or one track per media file, association between the tracks carrying the sparse media data and the periodic media tracks, operating points or preselection of tracks offering some choice for the media presentation. The encapsulation configuration also impacts the manifest generation module 306, in particular on the number of Periods, on the URLs to fetch the periodic media data and sparse media data on availability times for the different segments, on alternative versions of the periodic media data or sparse media data, if any. The configuration step may also consist in defining one or more periodic media tracks onto which the tracks containing the sparse media data will be aligned in terms of random access (for streaming or playout). For example, a video track may be selected as the track providing the media timeline. The fragment duration is specified (may be aligned with the GOP duration of a video encoder, may be arbitrary set to a given number of milliseconds or seconds, so as to provide regular access points). The number of fragments per segment is also set when media file comes as segment files 330. For example, in DASH, segment files may consist in an initialization segment followed by one or more media segment files. This initialization step allows the encapsulation module to generate the 'moov' box for the whole presentation, possibly output as an initialization segment 330 and possibly described in the streaming manifest by module 306.

After configuration or initialization 401, the encapsulation module starts a movie fragment in step 402. This movie fragment may also coincide with the beginning of a DASH media segment or CMAF Fragment. This consists in creating a movie fragment box and its hierarchy of sub boxes describing each, or a subset of (depending on encapsulation configuration), periodic and sparse track and their samples for the duration of the movie fragment. A movie fragment may contain one moof box with multiple traf sub-boxes: one per track or step 402 may create one movie fragment per periodic and sparse track. This depends on the encapsulation configuration. In a preferred embodiment, a track fragment decode time box ('tfdt') is inserted at the beginning of each track fragment, indicating the decode time for each track fragment. Each track may have default parameters defined in its track fragment header box. Video tracks are encapsulated, for example, using the ISO/IEC 14496-15 when the video is a NAL unit based compressed video formats (like AVC, HEVC, VVC . . . ). It may comply with CMAF profile for the codec in use. Audio tracks are encapsulated, for example using MPEG-H specification or any standard specification, derived from ISOBMFF and suitable for the audio codec in use. The sparse media data may use ISO/IEC 14496-30 for WebVTT tracks or timed text or ISO/IEC 23001-18 for timed events having a registered scheme_id identifying their type and payload, or any specification derived from ISOBMFF. When stored according to ISO/IEC 23001-18, the internal timing of the dynamic sample may be stored in the message_data parameter of an EventMessageInstanceBox (the presentation. The media data are stored and described (encapsulated) in step 403, for example according to an ISOBMFF-derived specification. This mainly consists in storing the media samples in the data part of the file 330 and in generating the sample description in data-structure or metadata part of the file 330. Then follows (or performed in parallel, for example sample after sample) the encapsulation of the samples for the sparse media data (also called timed events samples or timed events). The step 404 consists in locating sparse media data or a sparse sample (if input 326 is already encapsulated) in each sparse media data stream associated with the periodic media track defining the timeline. This may consist in looking for time information in the sparse media data (for example parsing WebVTT Cue for subtitles or any timing information in the data). This may require encapsulation module to have an analyzer module for each possible format in use. When the format is not supported by any analyzer, the encapsulation module warns the application or user that some sparse data may not be encapsulated in the media file 330 or the encapsulation module may generate an error and ask for continue or stop the encapsulation process). For input sparse data 326 already encapsulated, this consists in reading the sample description and for example the TimeToSampleBox to determine a start time (or presentation time or decoding time) and duration for a sample. If the periodic media track is already encapsulated in a fragmented manner, obtaining sample time and duration may consist in parsing the track fragment header or track run box. Additional information like sample groups indicating the synchronization samples or random-access samples may also be parsed. The encapsulation module checks whether the start time (or presentation time) of the sparse sample obtained in step 404 is aligned with the start time of the first periodic media sample in the track fragment of the track defining the timeline or not (step 405). There may be some applications applying the same steps for periodic media sample identified as random access point even if not located at the beginning of a fragment or at the beginning of a segment, when the distance between random access points should not be too high. This may be a requirement, for example, to serve the media presentation on-demand where client would issue requests for sparse data and periodic data at the same time. If test 405 is false, the sparse media data needs to be aligned to the media timeline (object of step 406, described in FIG. 6). This may lead to an indication in the metadata part of the media file, for example in sample description, of a time adjustment applying to a sample. Then, it checks whether the presentation duration of the sparse media data complies with the fragment duration in step 407. If the duration of the sparse sample is greater than the fragment duration, this duration needs to be refined as described in FIG. 6. This may lead to an indication in the metadata part of the media file, for example in sample description, of a time adjustment. The encapsulation module iterates on the sparse media data or (samples) until the end of the fragment in step 408. The processing iterates until no more fragment has to be generated (step 409). This number of fragments is the one from the periodic media track used to compute the presentation timeline during the configuration step 401. There may be cases where the duration of a sparse sample is time aligned with the end time of a fragment of a periodic track. In such case, if there is no immediately following sparse sample in the sparse track, the next fragment in the sparse track may start with an empty sample. This empty sample may have a decoding time indicated in a tfdt box so that the containing fragment or segment can be requested by streaming client. This empty sample may have its sample duration (or presentation duration) set to the time between the beginning of the containing track fragment and the start time of the next sparse sample.

Figure 5:
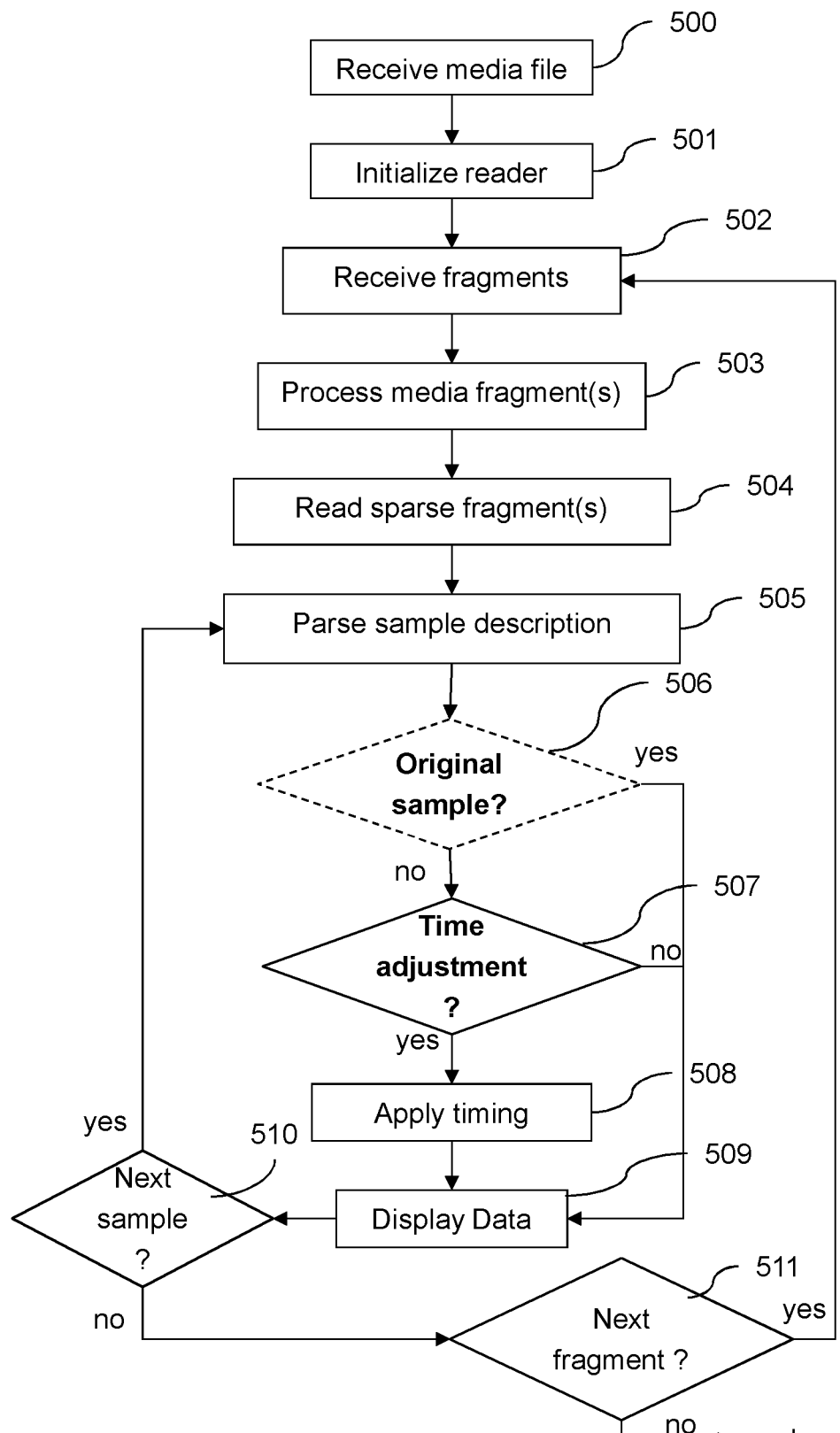
FIG. 5 illustrates the parsing process of a media file according to an embodiment of the invention.

FIG. 5 illustrates the parsing process of a media file according to an embodiment of the invention. The client may also be called "application" or "media player" (or player). The process starts by receiving in step 500 a media file or media segments files 330 generated according to embodiments of the invention, for example according to the process illustrated in FIG. 4. The reception may consist in a download, in a copy or in streaming or progressive transmission. When streamed, the streaming module 316 in the client is in charge of requesting media segments 330, using a streaming manifest, and of adapting the transmission. The de-encapsulation module 315 is an ISOBMFF reader parsing the track and sample description. It extracts the sample data, starting at a presentation start time indicated by an application or a user through a graphical user interface of a media player. There may be more or less data to extract depending on the track selection by the application or in the media player. The process described below applies to the selected tracks. The step 501 consists in the configuration of the reader or parser 315. This consists in reading the 'moov' box from the received media file 330 (or initialization segment when the media file consists in one or more media segments). For example, during this step the reader is informed about the periodic tracks and sparse tracks present in the file 330. The initialization step 501 may also be used in the streaming module to get more or less media segments, for example depending on the selected tracks or on seeking operations to the media timeline. Seeking points corresponding to stream access points may be obtained from sample group information lilke 'sync' or 'sap' or 'rap' or from a MovieFragmentRandomAccessBox when present or by parsing sample flags sample_is_non_sync_sample in a TrackRunBox. Upon player operation, the de-encapsulation module 315 seeks in the media timeline or continuously reads the presentation. Both operations are based on the organization of the media file, mainly segments or fragments. The next processing step then consists in receiving one or more fragments corresponding to a same time interval, for the different tracks (at least one periodic media track and at least one sparse media track) in step 502. The fragment(s) corresponding to periodic media data tracks are processed in step 503 according to derived specification of ISOMBFF so as to provide one or several bitstreams to the appropriate periodic media decoders (not represented in client 320). In parallel or after processing of media fragments, the parser 315, at step 504, processes each fragment for the current time interval on the media timeline of the periodic media tracks selected by the player. The sample description of the first sparse sample in the fragment is read in step 505. The parser has to determine in step 506 whether this first sample corresponds to an original sparse sample (no sample timing refinement or modification was necessary) or to a sparse sample for time alignment, or for synchronization, for example a duplicated sample, possibly requiring time adjustment information. This may be determined by an indication in the sample description like the presence of specific box for time adjustment or by explicit indication in the sample description, like for example the sample_flags value with a sample_has_redundancy=1. If the sample has been duplicated for time alignment or synchronization on the media timeline of a periodic track (test 506 false), this is an indication to parser to further inspect time information for this sample (start time and duration). This can be done by parsing time adjustment information, in step 507, as explained according to FIG. 6. This additional or adjustment of timing information is shared with the decoding or rendering module (not represented) for the sparse data in a step 508, in addition to the sparse media data. For example, only a part of the sample payload may be rendered in step 509 because a previous part was already rendered in a previous sample or because a next part will be rendered in a next sample. Only the part of the sparse sample relevant for the current periodic media sample is actually rendered. The parsing process iterates on next sparse samples, step 510, until the end of the current fragment. When no more samples are present in the fragment, it then processes the next fragment, step 511, if any, corresponding either to a seeking instruction in the periodic media timeline or to the next fragment when the presentation is continuously, linearly, played out.

The check by parser of original sample and the presence of time adjustment information may be done as one step. Some parsers may systematically look for a time adjustment indication (this is why the step 506 appears in dashed, because optional or may be skipped depending on parser implementation). These parsers may not rely on the information of sample duplication. This is because the sample duplication may occur in other scenario than the ones implying a timing adjustment. Looking for timing adjustment (507) in any case is more robust and avoids non-detection of timing adjustment to perform, but this requires more check in the file or segments by the parser. It is to noted that parser may record the media presentation, possibly as a defragmented media file, i.e. by reorganizing the metadata as tracks without movie fragments. When parser or reader performs a defragmentation and encounters duplicated events, the parser processes the duplicated samples to store one instance of this sample (i.e. do the reverse operation than the one performed by the encapsulation module during fragmentation, for example in steps 204-207). Detection of duplication is done at step 506 and time adjustment indication may help in building one sample from the duplicated ones. The sample duration mainly will need to be recomputed from the time adjustment of the duplicated samples.

Figure 6A:
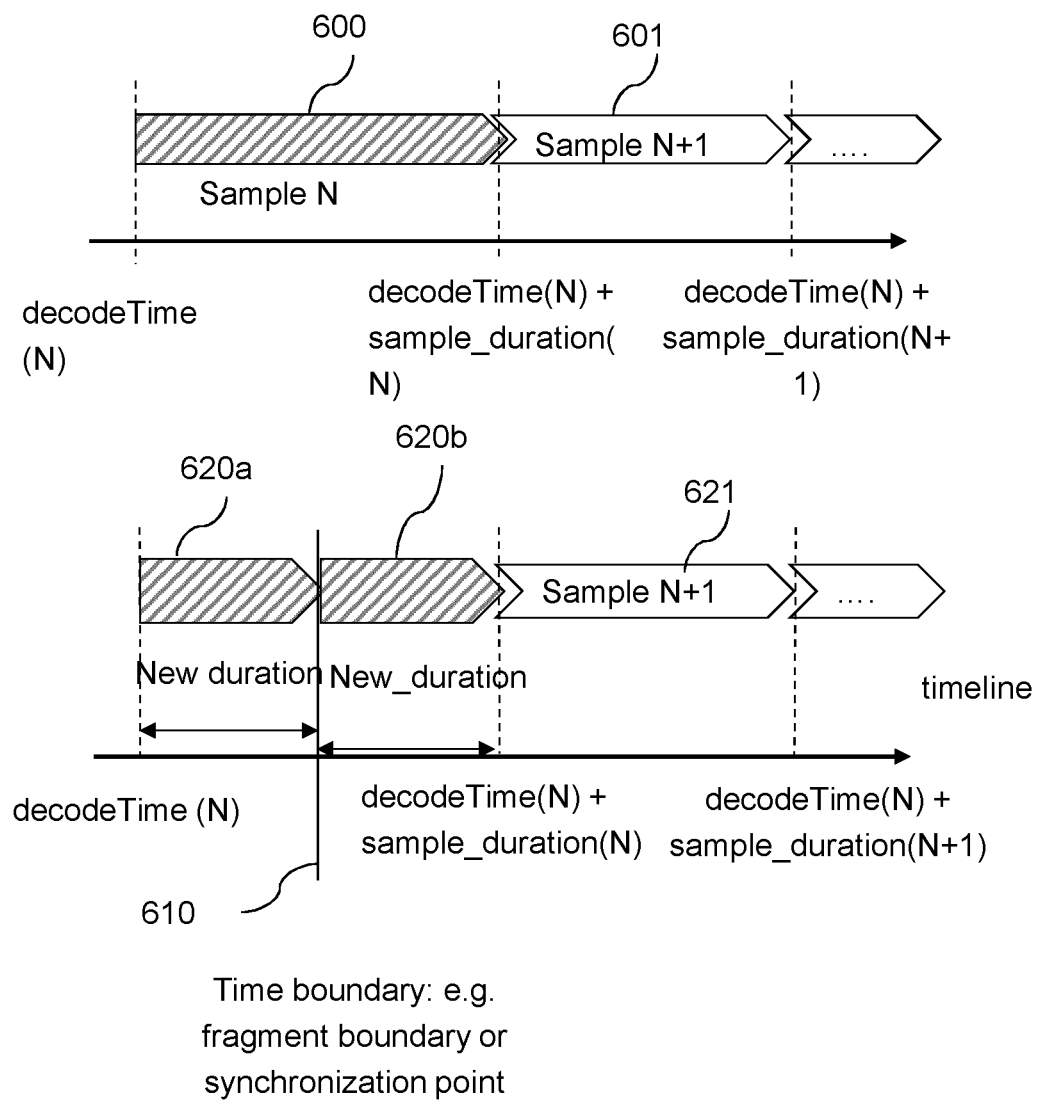
FIGS. 6a and 6b illustrate examples of a sparse sample containing timed events, or sample for sparse data that needs timing adjustment for alignment onto media fragments or synchronization points from periodic track.

FIG. 6a illustrates an example of a sparse sample containing timed events, or sample for sparse data that needs timing adjustment for alignment onto periodic media fragments. The timing adjustment deals with the internal timing contained in the dynamic sample. The example would be similar for a sparse sample requiring a time adjustment on any periodic sample defined as a random access point.

600 is a sparse sample for sparse data already encapsulated, it could have been sparse data to be encapsulated with their timing indication as well. 601 is the next sparse sample in the sparse data. Each sparse sample 600 or 601 has a start time and a presentation duration available in the sparse data or in sample description if already encapsulated. The start time corresponds to a decode time or presentation time. The presentation duration corresponds to sample duration on FIG. 6. There may be time instants where there are no sample applying, for example the sample N+1 601 may be an empty sample, meaning that no animation has to be rendered on top of another track like for example a video or an audio track. Alternatively, there may be no sample N+1 or a sample N+1 starting later in time and not necessarily after the duration of the sample N (this situation is not represented here). The encapsulation module may then indicate empty samples or even no sample at all. The time 610 indicates the start of a media fragment (or segment) in the presentation timeline. It may also correspond to the time of any periodic sample defined as a random access point in the associated periodic media track. It can be noted that the sample 600 starts before this fragment start. Then, it requires timing adjustment to allow a random access in the sparse data synchronized with the periodic media data at time 610. For this reason, the sample 600 may be split in two parts: 620*a* and 620*b*. It is to be noted that it may be split in further parts if its duration spans over multiple fragments of the periodic media track defining the presentation timeline. 620*a* is the part of sample 600 that should be rendered before the fragment boundary 610. 620*b* is the part of the sample 600 that should be rendered from the beginning of the fragment starting at boundary 610 to the end of the original sample 600 duration.

This situation corresponds to the test 405 on media alignment of the sparse data or sample in the encapsulation process of FIG. 4. Then, the encapsulation module performs the alignment with the periodic media timeline (FIG. 2*b*) or onto a time boundary (FIG. 2*a*), by splitting the sample 600 as explained on FIG. 6. Actually, the sample 600 may be copied or duplicated as two samples 620*a* and 620*b*. The start time and duration for these duplicated samples have to be adjusted, for example in the sample description box or sub-boxes. This can be done by modifying the sample description or by inserting a new box dedicated to the indication of time adjustment for a sample or both, as described in embodiments below.

On sample 620*a*, the duration of the sample has to be shortened to indicate that the sample ends at the time corresponding to the fragment boundary 610. But, in opposition to the edit list mechanism, it does not mean that the whole sample payload should be rendered on a shorter duration. Instead, this is an indication for readers (in step 508) that a specific part of the payload of the sample should be rendered and not the full payload of the original sample 600 (or data). In the case of sample 620*a*, only the animation or the event from start time to start_time+new duration should be rendered. The new duration is indicated in the sample description of the sample 620*a*, for example in the sample_duration field of trun box. On sample 620*b*, the start-time has to be modified to indicate that the sample rendering should start where it ended in sample 620*a*, corresponding to time 610, to make sure, in case of continuous reading that the original intend of the content creator is fulfilled and that there won't be de-synchronisation between the periodic media and the animation or effects applying to it for this specific time. The duration for this sample 620*b* also needs to be updated to reflect the new duration for the sample ending at the beginning of sample 621 (corresponding to sample 601): this may be indicated in the sample_duration field of the trun box.

Figure 6B:
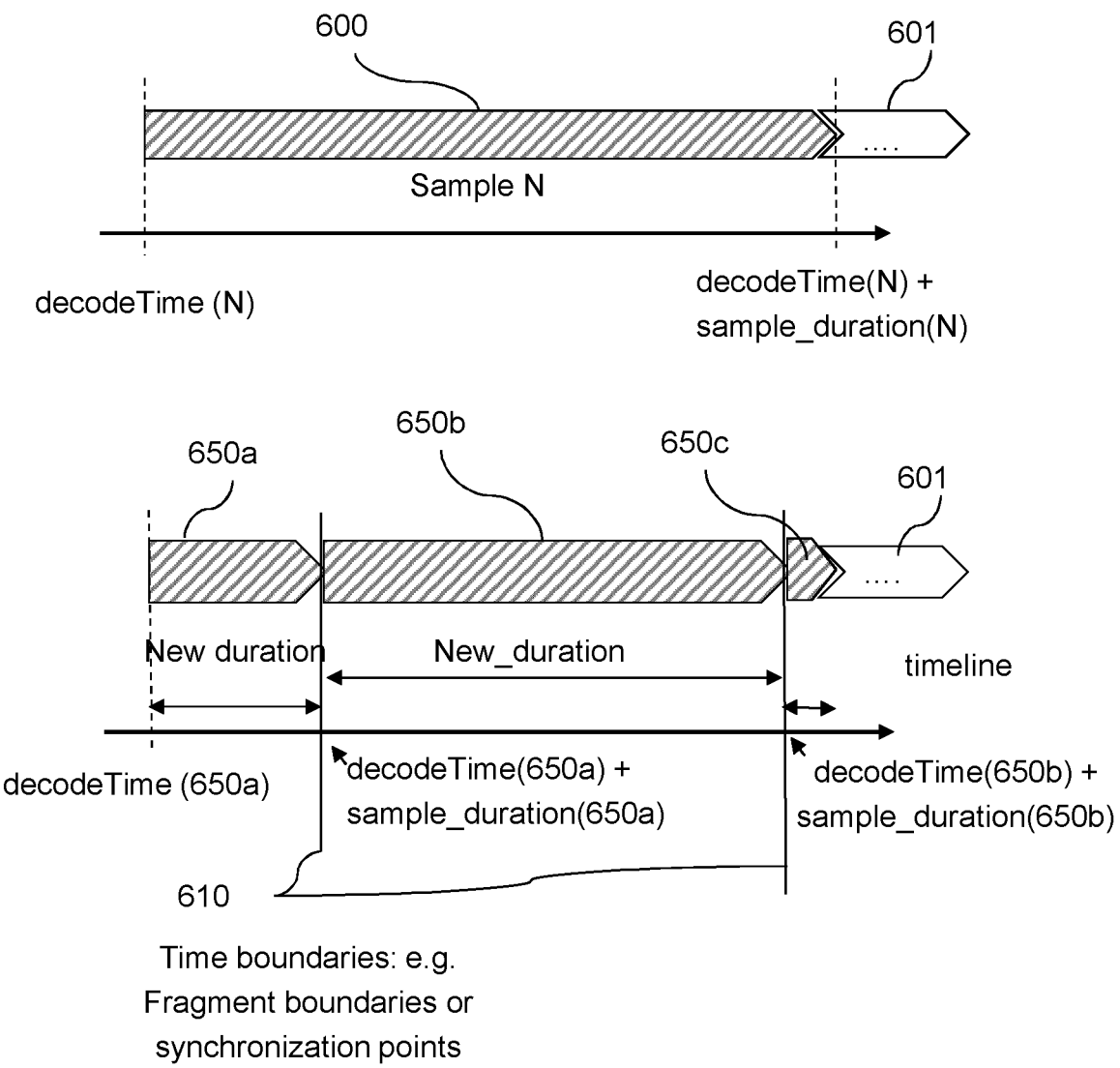

FIG. 6*b* illustrates another example of a sparse sample containing timed events, or sample for sparse data that needs timing adjustment for alignment onto periodic media fragments (FIG. 2*b*) or onto time boundary (FIG. 2*a*). This time, the first sample 600 has a duration greater than the fragment duration or than the distance between two stream access points in an associated periodic track or between two time boundaries. The sample 600 is then fragmented into samples 650*a*, 650*b* and 650*c*. The decoding time for sample 650*c* is the same decoding time as sample 600 in the non-fragmented sparse track or sparse media data. The duration of sample 650*c* is set to the new duration equal time of the first fragment_boundary (or time boundary) 610 minus the decoding time of sample 650*a*. An indication of the original duration of sample 600 may be indicated in the sample description of 650*a*. The sample 650*b* is a particular case: its duration covers a whole fragment duration. The decoding time may be indicated in a tfdt box as equal to the decoding time of sample 600 plus the duration of the sample 650*a*. The sample duration for 650*b* may be set to the fragment duration (time between the two fragment boundaries 610). The sample description for 650*b* may contain time adjustment information to indicate that only a part of the sample 600 should be rendered on the fragment between the two boundaries. The last sample 650*c*, as for 650*b* may have a decode time information indicated in tfdt and a sample duration set to the remaining time of sample 600: decodeTime (sample 600) plus the sample_duration (sample 600) minus time for the second fragment boundary 610. The sample description for sample 650*c* may have indication that only the last part of the sample 600 is to be rendered when playing from fragment starting at the second fragment boundary or synchronization point 610. The update of sample duration are done at encapsulation time at steps 406 or 407.

As a summary, from the examples of FIG. 6*a* or 6*b*:
- a sparse sample may have only its starting time modified, for example sparse sample 620*b*.
- a sparse sample may have only its duration modified, for example sparse sample 620*a*.
- a sparse sample may have both starting time and duration time modified. Indeed, a sparse sample may span over one or more fragments. This may be the case when the original duration of the sparse sample is greater than the duration of a movie fragment (or segment) or greater than the time between two successive random access points.
- indicating the decoding time of the sparse sample synchronized with their associated periodic tracks or synchronised onto time boundaries allows clients to request media segments for sparse track synchronously with their requests to media segments for periodic track. The information indicated in the tfdt may be used by streaming client to build their URL, for example using segment template in DASH with the time as a template parameter.

In case a segment contains multiple fragments and only the first fragment in the segment is a stream access point, the split of timed events may apply only on the first fragment of this segment (if no sparse data or sample for sparse data is aligned with the media fragment(s)) or to the last fragment of this segment (if sparse data or sample for sparse data has a duration greater than the segment duration) or to both. This may apply to CMAF fragments containing CMAF chunks for low latency streaming. It may apply to all fragments when the duration of a sparse data or sparse sample starting before the beginning of the segment has a duration greater than the segment duration.

Of course, there may be cases where start of sample 600 aligns with the fragment boundary. In this case, there is no need to update the start time of the sample 600. As well, there may be cases where the duration of the last sparse sample of a fragment may not need to be adjusted in time. The encapsulation module checks whether duration of a sparse sample may updated to make sure that the sample's start_time plus the sample's duration is not greater than the fragment (or segment) duration.

Different alternative embodiments may be proposed for indicating time adjustment in a sparse sample. It is proposed to indicate additional timing information for timed events or dynamic samples or sparse samples on the fragment or segment boundaries or possibly at time corresponding to stream access points of a periodic track. A new box may be defined as a Fragmented Sample Time Adjustment Box (the box name and its four-character code are examples, other names or codes not conflicting with existing boxes may be also be used) in a first embodiment:

Box Type: 'fsta'
Container: TrackFragmentBox, for example after or near the 'tfdt' box
Mandatory: No
Quantity: Zero or one (per track fragment)

The FragmentedSampleTimeAdjustment Box may provide the elapsed time, measured in media timescale of the track, of the first sample in decoding order in the track fragment. This elapsed time corresponds to the time elapsed within this sample during a preceding sample for the same timed events in a previous track fragment of this track.

The FragmentedSampleTimeAdjustmentBox may provide the original duration, measured in media timescale of the track, of the last sample in decoding order in the track fragment.

It is recalled that a sample may be both first and last sample in a track fragment as illustrated on FIG. 6b. In this case a timed event sample with a sample duration greater than the duration of one movie fragment (or segment) may be duplicated as a last segment in a first fragment (or segment), as a first but also last segment in a 2nd fragment and possibly as a first sample in a 3rd fragment (or segment).

The presence of this box may be used by parser to determine a sample in a sparse track as a synchronization sample, possibly duplicated from a preceding sparse sample or possibly copied into a sample in the next fragment in the same sparse track. It can be useful to document that the first sample of a fragment (or segment) is a copy of the previous sample, if any, and that this sample original start time was intended to be before its actual sample decode time. This allows rewinding the sample playback time at tune-in or seeking but ignoring it in regular playback mode.

This can also be useful to document that the last sample duration was truncated to respect fragmentation constraints, and that the intended duration of the sample is longer than its actual duration in the fragment; this allows exact processing of samples with internal timing logic dependent on the sample duration (such as text animations).

The following flags values may be defined for the FragmentedSampleTimeAdjustmentBox, allowing one or another or both parameters to be indicated
FSTA_ORIGINAL_DURATION: flags value is 0x000001. If set, the box describes the original duration of the last sample of the track fragment
FSTA_ELAPSED_DURATION: flags value is 0x000002. If set, the box describes the elapsed duration of the first sample of the track fragment When this box is present and flags value FSTA_ORIGINAL_DURATION is set, it indicates that the last sample of the track fragment (containing this box) has a shorter duration than originally authored, and this original duration is signaled. The originalDuration shall be equal to or greater than the duration of the last sample in this track fragment.

When this box is present and flags value FSTA_ELAPSED_DURATION is set, the first sample of the track fragment is treated as if its associated sample_flags value has sample_depends_on=2 and sample_has_redundancy=1, indicating that it can be discarded by players and its duration added to the duration of the preceding one, to maintain the timing of subsequent samples when continuously playing the file, or consecutive fragments (or segments).

When playing linearly the media presentation (i.e. no random access, no seek) and the first sample of a new fragment: if a previous sample was already received for this track, the sample duration of this previous sample is extended by the duration of this first sample and the elapsedDuration possibly present in a fsta box is ignored. If the previous sample had an originalDuration signaled, the extended duration shall be:
less than originalDuration if this is the only sample of the track fragment and it has an originalDuration associated (for example as sample 650b on FIG. 6b)
equal to originalDuration otherwise (for example as sample 620b on FIG. 6a)

When player tunes-in or seeks into the media presentation, if no previous sample were received for this track, the first sample (corresponding to the stream access point for tune-in or seek) is processed at its sample decode time, for example indicated in a tfdt box, as if it was being presented for the indicated elapsedDuration. In other words, player considers that an amount of time already has elapsed from the beginning of the timed event contained in the sample. This amount of time is the one indicated by the elapsed_duration parameter of the fsta box. For example, for animated text onto video, the player would not play the animation from its beginning but present it from time equal to elapsed_time from the fsta box.

It should be noted that FSTA_ORIGINAL_DURATION and FSTA_ELAPSED_DURATION may be set together in a track fragment with multiple samples (describing that first sample is a continuation and last sample is truncated) or with a single sample (describing the only sample is both a continuation and truncated, for example when splitting a sample, as described in FIG. 6, with a duration longer than one or more fragments).

The syntax of the FragmentedSampleTimeAdjustmentBox may be defined as follows:

```
aligned(8) class FragmentedSampleTimeAdjustmentBox extends
FullBox('fsta', 0, flags)
{
  if (flags & FSTA_ORIGINAL_DURATION) unsigned int(32)
originalDuration;
  if (flags & FSTA_ELAPSED_DURATION) unsigned int(32)
elapsedDuration;
}
```

The Semantics for the FragmentedSampleTimeAdjustmentBox may be defined as follows:
originalDuration gives the original duration of the last sample of the track fragment, in media timescale of this sample
elapsedDuration gives the elapsed duration of the first sample of the track fragment, in media timescale of this sample According to an alternative embodiment, it is proposed to indicate additional timing information for timed events samples on the fragment or segment boundaries by modifying an existing box. We propose to reuse the 'tfdt' box as follows:

The additional timing information could be directly added to the existing 'tfdt' box for capacity reasons, saving one full box header.

```
aligned(8) class TrackFragmentBaseMediaDecodeTimeBox extends
FullBox('tfdt', version, flags) {
if (version==1) {
  unsigned int(64) baseMediaDecodeTime;
} else { // version==0
  unsigned int(32) baseMediaDecodeTime;
}
if (flags & FSTA_ORIGINAL_DURATION) unsigned int(32)
  originalDuration;
if (flags & FSTA_ELAPSED_DURATION) unsigned int(32)
  elapsedDuration;
}
```

Where the originalDuration and elapsedDuration have the same semantics as in the previous embodiment.

In a variant, instead of flags values, the additional timing information may be indicated in a new version of the 'tfdt' box (changes indicated in bold):

```
aligned(8) class TrackFragmentBaseMediaDecodeTimeBox
  extends FullBox('tfdt',
version,              0)           {
  if (version == 3) {
    unsigned int(64) baseMediaDecodeTime;
    unsigned int(32) originalDuration;
    unsigned int(32) elapsedDuration;
  }
  if (version == 2) {
    unsigned int(32) baseMediaDecodeTime;
    unsigned int(32) originalDuration;
    unsigned int(32) elapsedDuration;
  }
  else if (version==1) {
    unsigned int(64) baseMediaDecodeTime;
  } else { // version==0
    unsigned int(32) baseMediaDecodeTime;
  }
}
```

Where the originalDuration and elapsedDuration have the same semantics as in the previous embodiments. With this embodiment, player may determine sparse samples for synchronization by inspected the flags or the version of the tfdt box. While the usual parameters may be used to request the media segments for sparse tracks, the new parameters may be used by player to inform renderer of the sparse sample that only partial rendering of sample may be done, either at the beginning, at the end or at both sides of a sparse sample for synchronization.

According to another embodiment, when the sparse track is not fragmented, the timing adjustment may be indicated using sample group mechanism. Using sample group approach may be interesting if the sparse samples are periodic. In this case the time adjustment may repeat from one sample to another and may declared once for a group of samples. Moreover, sample groups are allowed in fragments. A sample group description may be defined for each fragment, or at 'trak' level at the beginning of the media file.

In a first variant, a new grouping type is defined with a dedicated 4CC (for example 'tadj') for Time Adjustment and a new sample group entry is defined, for example as a TimeAdjustmentGroupEntry:

```
class TimeAdjustmentGroupEntry ( )
extends SampleGroupDescriptionEntry ('tadj')
{
  bit(1) FSTA_ORIGINAL_DURATION;
  bit(1) FSTA_ELAPSED_DURATION;
  bit(6) reserved;
  if (FSTA_ORIGINAL_DURATION) unsigned int(32)
    originalDuration;
  if (FSTA_ELAPSED_DURATION) unsigned int(32)
    elapsedDuration;
}
``` where:
FSTA_ORIGINAL_DURATION is a parameter that, when set to 1, indicates that the sample mapped to this sample group description entry has an original duration provided in this entry. When set to 0, no original duration is provided.

FSTA_ELAPSED_DURATION is a value that, when set to 1 indicated the the sample mapped to this sample group description entry has an elapsed duration provided in this entry. When set to 0, no elapsed duration is provided.

where originalDuration gives for a sample mapped to this sample group description entry its original duration (i.e. before split or duplication of the corresponding original sample to fulfill encapsulation constraints). The value is expressed in media timescale of the track.

elapsedDuration gives for a sample mapped to this sample group description entry the elapsed duration since the previous sample of the track. The value is expressed in media timescale of the track.

In a variant, where the sample having time adjustment corresponds to synchronization samples or to stream access points or to random access samples, the timing adjustment may be indicated respectively as part of the 'sync' or of the 'sap' or of the 'rap' sample group, thus avoiding the declaration of another sample group. In these variants, the payload for these sample group entries may add a 1-bit parameter (reusing reserved bits when available or introducing a new byte when no available reserved bits) to indicate whether time adjustment information is contained in a sample group description entry. When set, the sample description entry then contains an additional payload, for example the one from the TimeAdjustmentGroupEntry defined above. When this 1-bit parameter is not set, no time adjustment is required for the samples mapped to this sample group description entry.

In this embodiment, independently of the variants, when the sample presentation time needs to be adjusted, this may be done in the SampleToTimeBox 'stts' box. As well, to indicate that a sample is a split of an original sample or a duplication of a previous sample, the SampleDependencyTypeBox may be used in the sample description of the tracks with the following values for the duplicated samples: sample_depends_on=2 and sample_has_redundancy=1. By doing so, the parser may discard the duplicated sample when playing continuously the file, using the previous sample at its original duration. The timing adjustment possibly indicated in the sample description or sample group are interpreted by parser as in the fragmented case to adjust the internal timing of dynamic samples.

According to another embodiment, instead of splitting or duplicating samples at the end or beginning of fragments of a sparse track, a sample group is used to indicate that the first sample is a particular synchronization sample and instructions on how to get this sample are indicated by the encapsulation module, for example in step 406. These instructions are used by parsers, for example in step 507, to get the sample payload. These instructions may be provided in various ways:

encapsulation module may create an empty sample as the first sample of a fragment of a sparse track, marked as a SAP type indicating a gradual decoding refresh from a previous sparse sample. The previous SAP sample may be retrieved by providing a tfdt box having a decode base time equal to the decode base time of the previous fragment containing the previous SAP sample. By doing so, client can issue request on time, obtain the previous sample and start playing the animation ahead of the periodic track to synchronise the rendering on the synchronization point corresponding to the first sample of the track fragment.

The same effect may be obtained by indicating an empty sample as the first sample of a fragment of the sparse track with recovery instructions and specific SAP type (either SAP Type=4 or a reserved value indicating the recovery from previous samples is needed, possibly with an additional request). This may not be adapted for low latency streaming. The recovery information may be provided either as a sample group of type 'roll' with a roll_distance providing the number of sparse samples that need to be decoded in order for a sample to be decoded correctly equal to the negative offset in number of samples. For sparse tracks, the value may be −1 to indicate the previous sparse sample. During continuous playout between consecutive fragments, readers may ignore this information.

Alternatively, to the roll sample group, the sample description may directly provide the indication that previous sample needs to be retrieved and played from the start time of the empty sample added as a synchronization sample in the track fragment of the sparse track. For example, the samples flags "sample_depends_on" contains a specific value, for example to 1 indicating that sample depends on other sample and with sample_has_redundancy set to 1. These combinations of values indicate to players that the empty sample used as synchronization point depends on the previous sample in the same sparse track. This may be combined with tfdt indicating the decode base time for previous fragment.

In above variants, the empty may have its sample_is_non_sync_sample flags, for example in TrackRunBox (trun) set to 0 to indicate that it is a sync sample.

Alternatively to empty samples as synchronization sample in a fragment for sparse track, previous sample is duplicated and its rendering is adapted by a specific edit list at fragment level. This edit list may be specified by extending either the EditAdjustmentBox under consideration in ISOBMFF or track fragment adjustment ('tfad') box from 3GPP TS26.244 boxes, this extension through flags or version indicating that the edit applies only to one or two samples, and not to the whole fragment. Indeed, the EditAdjustmentBox cannot be used directly because the initial offset (initial_delta) proposed is a positive integer shifting the presentation time. However, in order to "skip" the beginning of the duplicated sample in a track fragment, this would require that the 'tfdt' of the duplicated sample is the same as the 'tfdt' of the previous one; this would then require that the duration of the previous sample is 0 to keep the ISOBMFF or CMAF rule requiring that tfdt (N+1)>=tfdt(N)+sample_duration(N). Having a sample duration of 0 may break the processing of the previous sample. Then, to extend the EditAdjustementBox, flags values first_sample and last_sample may be defined and when set respectively indicate that the start offset (e.g. the initial_delta in the EditAdjustmentBox) may applyto the first samples or an end clipping (e.g. the final_delta in EditAdjustmentBox) may apply to the last sample of the movie fragment. Both start offset (e.g. initial_delta) and end clipping (e.g. final delta) may apply within a fragment respectively on first and last sample of this fragment.

Yet, in another alternative, the synchronization points for sparse tracks are provided through an external stream track (EST). The EST track is extended to support random access samples that are no more necessarily video samples but may also contain samples with timed events, or sparse samples in short. The kind of samples in the EST track is indicated by the sample entry of the track. The EST track is associated to a main source track (MST), for example a periodic track providing the media timeline like an audio or video track. Some samples in the MST may refer to some sparse samples in the EST through a specific sample group indicating the index of the sparse sample to align with a sample of the video. For example, a specific sample group entry is defined as follows (name and four-character code are just examples and any name or 4CC not conflicting with existing ones may be used):

```
class VisualOverlayEntry( ) extends
VisualSampleGroupEntry('evos') {
    unsigned int(7) reserved = 0;
    unsigned int(1) first_sample; // indicates 1st or last sample in a fragment
    unsigned int(64) decode_time;
}
```

These specific visual sample group entries may only be defined in sgpd present in track fragments to link periodic samples to sparse samples in an external track. The first_sample field indicates whether the sample is the first of a track fragment or not. The decode_time field provides the absolute decode time for the first or last (depending on first_sample filed) sample of the track fragment. This can be used to retrieve the corresponding sparse sample, for example from a stts or ctts box or from the sample description in TrackRunBox in the associated EST. EST and MST may be associated through a specific track reference type to link periodic samples to sparse samples or may reuse the track reference type 'aest' but extending its semantics to allow any kind of sample to link to sparse sample. The EST may not be fragmented and may be retrieved on-demand when tuning-in or seeking in the periodic track.

Figure 7:
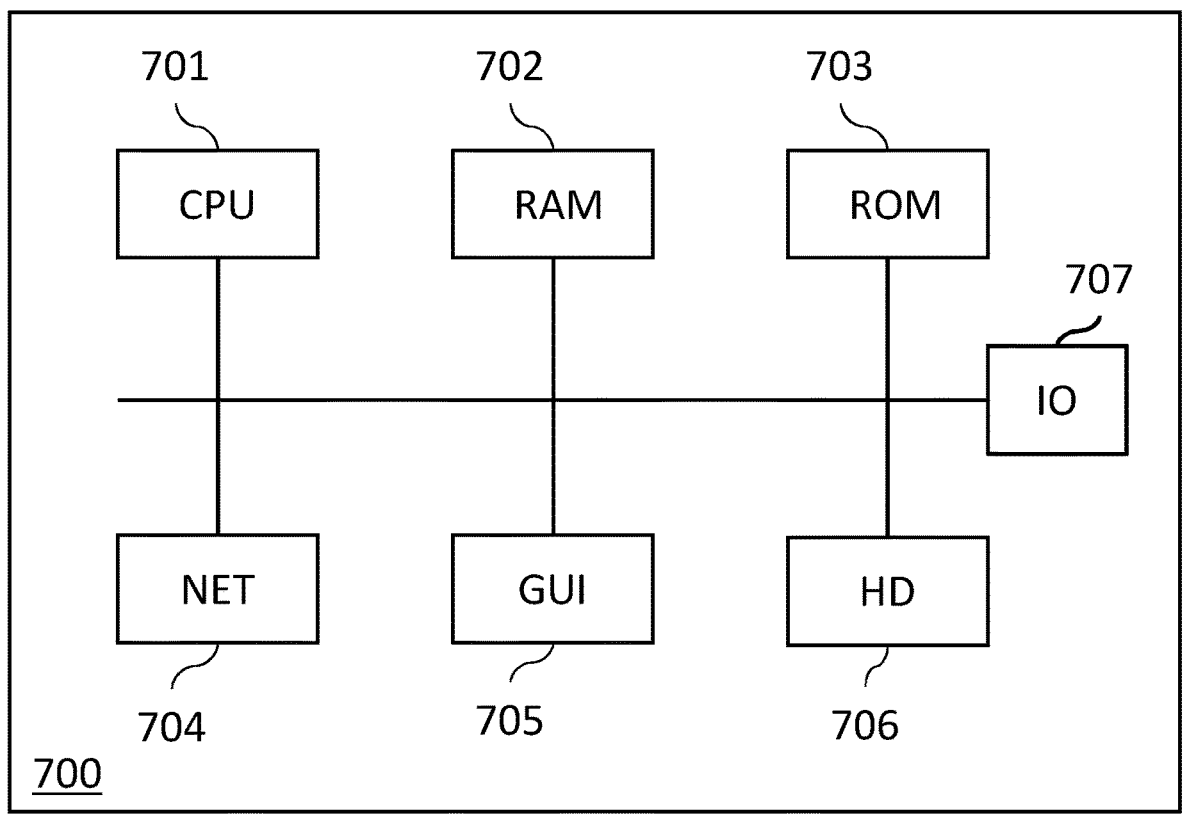
FIG. 7 is a schematic block diagram of a computing device for implementation of one or more embodiments of the invention.

FIG. 7 is a schematic block diagram of a computing device 700 for implementation of one or more embodiments of the invention. The computing device 700 may be a device such as a micro-computer, a workstation or a light portable device. The computing device 700 comprises a communication bus connected to:

a central processing unit 701, such as a microprocessor, denoted CPU;

a random access memory 702, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port for example;

a read only memory 703, denoted ROM, for storing computer programs for implementing embodiments of the invention;

a network interface 704 is typically connected to a communication network over which digital data to be processed are transmitted or received. The network interface 704 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 701;

a graphical user interface 705 may be used for receiving inputs from a user or to display information to a user;

a hard disk 706 denoted HD may be provided as a mass storage device;

an I/O module 707 may be used for receiving/sending data from/to external devices such as a video source or display.

The executable code may be stored either in read only memory 703, on the hard disk 706 or on a removable digital medium such as for example a disk. According to a variant, the executable code of the programs can be received by means of a communication network, via the network interface 704, in order to be stored in one of the storage means of the communication device 700, such as the hard disk 706, before being executed.

The central processing unit 701 is adapted to control and direct the execution of the instructions or portions of software code of the program or programs according to embodiments of the invention, which instructions are stored in one of the aforementioned storage means. After powering on, the CPU 701 is capable of executing instructions from main RAM memory 702 relating to a software application after those instructions have been loaded from the program ROM 703 or the hard-disc (HD) 706 for example. Such a software application, when executed by the CPU 701, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating media data into a media file, the method comprising:
   obtaining a time boundary in a time interval corresponding to the presentation duration of an original sample of the media data;
   duplicating the original sample into two consecutive samples separated by the time boundary, the two consecutive samples being the original sample and a copy of the original sample;
   generating a time adjustment indication indicating for each consecutive sample the relationship between the time interval corresponding to the presentation duration of the consecutive sample and the time interval corresponding to the presentation duration of the original sample; and
   encapsulating the media data comprising the consecutive samples and the time adjustment indication in the media file, the time adjustment indication being located in metadata describing the media data.

2. The method of claim 1, wherein the time adjustment indication comprises at least one of:
   an elapsed duration corresponding to a time difference between a presentation time of the original sample and a presentation time of the copy of the original sample; and
   an original duration corresponding to the duration of the original sample.

3. The method of claim 1, wherein the media data are encapsulated into a track, and wherein the time boundary corresponds to a random access point of the track.

4. The method of claim 1, wherein the media data are encapsulated into a fragmented track, and wherein the time boundary corresponds to a fragment boundary of the track.

5. The method of claim 4, wherein the track comprising a data part comprising the media samples and a metadata part consisting in a hierarchy of boxes describing the track, the time adjustment indication is encapsulated in a track fragment box describing the fragment of the track.

6. The method of claim 5, wherein the time adjustment indication comprises:
   a first indication for indicating that the last sample of the track fragment has a shorter duration than the corresponding original sample; and
   a second indication for indicating that the first sample of the track fragment is a copy of a previous sample.

7. The method of claim 1, wherein the original sample comprises media data which rendering evolves during the presentation duration of the sample.

8. A non-transitory computer-readable storage medium storing instructions of a computer program for implementing a method according to claim 1.

9. A method for rendering media data from a media file, the method comprising:
   obtaining samples of media data and metadata describing the media samples from the media file;
   obtaining in the metadata a time adjustment indication relative to a copy of an original sample among the obtained samples, the copy of the original sample being duplicated from an original sample, the time adjustment indication indicating for the copy of the original sample the relationship between the time interval corresponding to the presentation duration of the duplicated sample and the time interval corresponding to the presentation duration of the original sample; and rendering the media data of the copy of the original sample based on the time adjustment indication.

10. The method of claim 9, wherein the time adjustment indication comprises at least one of:

an elapsed duration corresponding to a time difference between a presentation time of the original sample and a presentation time of the copy of the original sample; and an original duration corresponding to the duration of the original sample.

11. The method of claim 9, wherein the media data are encapsulated into a track, and wherein the copy of the original sample corresponds to a random access point of the track.

12. The method of claim 9, wherein the media data are encapsulated into a fragmented track, and wherein the copy of the original sample corresponds to a fragment boundary of the track.

13. The method of claim 12, wherein the track comprising a data part comprising the media samples and a metadata part consisting in a hierarchy of boxes describing the track, the time adjustment indication is obtained from a track fragment box describing the fragment of the track.

14. The method of claim 12, wherein the time adjustment indication comprises:

a first indication for indicating that the last sample of the track fragment has a shorter duration than the corresponding original sample; and a second indication for indicating that the first sample of the track fragment is a copy of a previous sample.

15. A device for encapsulating media data into a media file, the device comprising a processor configured for:

obtaining a time boundary in a time interval corresponding to the presentation duration of an original sample of the media data;

duplicating the original sample into two consecutive samples separated by the time boundary, the two consecutive samples being the original sample and a copy of the original sample;

generating a time adjustment indication indicating for each consecutive sample the relationship between the time interval corresponding to the presentation duration of the consecutive sample and the time interval corresponding to the presentation duration of the original sample; and encapsulating the media data comprising the consecutive samples and the time adjustment indication in the media file, the time adjustment indication being located in metadata describing the media data.

16. A device for rendering media data from a media file, the device comprising a processor configured for:

obtaining samples of media data and metadata describing the media samples from the media file;

obtaining in the metadata a time adjustment indication relative to a copy of an original sample among the obtained samples, the copy of the original sample being duplicated from an original sample, the time adjustment indication indicating for the copy of the original sample the relationship between the time interval corresponding to the presentation duration of the copy of the original sample and the time interval corresponding to the presentation duration of the original sample; and rendering the media data of the copy of the original sample based on the time adjustment indication.

* * * * *